(12) United States Patent
Rydnell et al.

(10) Patent No.: US 8,315,227 B2
(45) Date of Patent: Nov. 20, 2012

(54) GTP FOR INTEGRATION OF MULTIPLE ACCESS

(75) Inventors: Gunnar Rydnell, Frölunda (SE); Stefan Rommer, Frölunda (SE); Krister Boman, Mölndal (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1111 days.

(21) Appl. No.: 12/088,372

(22) PCT Filed: Sep. 27, 2005

(86) PCT No.: PCT/EP2005/010397

§ 371 (c)(1),
(2), (4) Date: Mar. 27, 2008

(87) PCT Pub. No.: WO2007/038947

PCT Pub. Date: Apr. 12, 2007

(65) Prior Publication Data

US 2008/0219218 A1    Sep. 11, 2008

(51) Int. Cl.
*H04W 4/00* (2009.01)

(52) U.S. Cl. ............... 370/331; 370/328; 455/432.1; 455/435.1; 455/436; 455/437; 455/442

(58) Field of Classification Search ................ None
See application file for complete search history.

(56) References Cited

U.S. PATENT DOCUMENTS

| | | | |
|---|---|---|---|
| 5,729,537 A * | 3/1998 | Billstrom | 370/329 |
| 7,151,931 B2 * | 12/2006 | Tsao et al. | 455/435.2 |
| 7,333,793 B2 * | 2/2008 | Niemela et al. | 455/336 |
| 7,346,027 B2 * | 3/2008 | Bossoli et al. | 370/328 |
| 7,512,104 B2 * | 3/2009 | Bjelland et al. | 370/338 |
| 7,675,881 B2 * | 3/2010 | Verma et al. | 370/328 |
| 7,738,871 B2 * | 6/2010 | Olvera-Hernandez et al. | 455/436 |
| 2001/0017850 A1 * | 8/2001 | Kalliokulju et al. | 370/331 |
| 2002/0176414 A1 * | 11/2002 | Miki et al. | 370/389 |
| 2003/0031151 A1 * | 2/2003 | Sharma et al. | 370/338 |
| 2003/0133421 A1 * | 7/2003 | Sundar et al. | 370/328 |
| 2003/0176187 A1 * | 9/2003 | Menzel et al. | 455/432.1 |
| 2004/0017798 A1 * | 1/2004 | Hurtta et al. | 370/352 |
| 2004/0018841 A1 | 1/2004 | Trossen | |
| 2004/0077341 A1 | 4/2004 | Chandranmenon et al. | |
| 2004/0122954 A1 * | 6/2004 | Shaheen | 709/227 |
| 2004/0147262 A1 * | 7/2004 | Lescuyer et al. | 455/434 |
| 2004/0156329 A1 | 8/2004 | Baeck et al. | |
| 2004/0203765 A1 | 10/2004 | Das et al. | |
| 2004/0203792 A1 * | 10/2004 | Shaheen et al. | 455/444 |
| 2004/0213181 A1 | 10/2004 | Grech et al. | |
| 2005/0025164 A1 * | 2/2005 | Kavanagh et al. | 370/401 |
| 2005/0083893 A1 * | 4/2005 | Purkayastha et al. | 370/338 |
| 2005/0130659 A1 * | 6/2005 | Grech et al. | 455/436 |

(Continued)

*Primary Examiner* — Ian N Moore
*Assistant Examiner* — Dung B Huynh

(57) ABSTRACT

A network architecture comprising at least one core network, each core network comprising a number of packet data gateway access supporting nodes GASNs handling mobile user station access over an access network, said core network(s) further providing access to one or more global packet data communication networks (IN), and one or more nodes holding subscriber or mobile user station related information. The GASNs are further adapted to support intercommunication over a mobility protocol interface to, at reception of a request for change of access type from a mobile user station, establish information about the previous GASN of the mobile user station, and to, using the established information, update an established communication context concerning the mobile user station or create a new communication context concerning the mobile user station such that mobility between different access network types is enabled for a mobile user station without interruption of an ongoing session.

19 Claims, 15 Drawing Sheets

U.S. PATENT DOCUMENTS

| | | | |
|---|---|---|---|
| 2005/0202815 A1* | 9/2005 | Verma et al. | 455/433 |
| 2005/0266842 A1* | 12/2005 | Nasielski et al. | 455/432.1 |
| 2005/0271013 A1* | 12/2005 | Shaheen | 370/331 |
| 2006/0126565 A1* | 6/2006 | Shaheen | 370/331 |
| 2006/0153124 A1* | 7/2006 | Kant et al. | 370/328 |
| 2006/0229068 A1* | 10/2006 | Niemela et al. | 455/426.1 |
| 2006/0276192 A1* | 12/2006 | Dutta et al. | 455/436 |
| 2008/0095119 A1* | 4/2008 | Bachmann et al. | 370/332 |
| 2008/0130637 A1* | 6/2008 | Kant et al. | 370/389 |

* cited by examiner

GTP FOR INTEGRATION OF MULTIPLE ACCESS

FIELD OF THE INVENTION

The present invention relates to a network architecture which comprises at least one core network. Each core network comprises a number of packet data gateway access supporting nodes handling mobile user station access over an access network and which core network also provides access to a global packet data communication network or a third party controlled packet data network. It further includes a system of one or more nodes holding subscriber or mobile user station related information.

The invention also relates to a core network node comprising a packet data gateway access supporting node handling mobile user station access over an access network, which core network further provides access to external, global or local, or third party controlled packet data networks such as Internet or intranets etc. Still further the invention relates to a dual or a multimode mobile user station supporting access using at least two different access technologies over at least two different access network types to a core network. Further yet the invention relates to a method for providing dual or multimode mobile user stations with access to applications over a network architecture comprising one or more core networks to which mobile user stations can be connected or attached over an access system using a first access technology.

STATE OF THE ART

New and coming generations of communication networks will be able to provide end users with access to applications over a plurality of, or multiple, access types using different access technologies and/or different types of user terminals. However, networks of today are capable to provide user mobility only as long as a user is roaming within networks using the same access technology. 3G (3GPP, Third Generation Partnership Project) systems provide user access and mobility through the GMM (GPRS Mobility Management), for communication between core network nodes and radio network nodes, particularly RNC (Radio Network Control node), and GTP (GPRS Tunneling Protocol) for communication between core network nodes on the packet switched (PS) side, i.e. for a GPRS attached user. 3GPP furthermore has specified the I-WLAN, Integrated Wireless Local Area Network, system for integrated access for WLAN users to 3G services. The I-WLAN standard in e.g. 3GPP TS 23.234 v. 6.5.0, TS 29.234 v.6.3.0, specifies how the user can use his SIM/USIM (Subscriber Identity Module/UMTS SIM) and 3G security mechanisms to be authenticated by the 3G systems and also get access to 3G services.

However, today it is not possible for multi-access capable terminals, i.e. dual mode or a multimode terminals, to roam between access systems using different access technologies. There is no 3GPP specification suggesting how handover between different access systems could be made. Today existing networks could for example provide mobility on top of access networks, for example using mobile IP. Such a solution is however a non-integrated solution associated with several drawbacks. It would for example require that the user terminal supports mobile IP in addition to existing mobility support. Two mobility solutions would then be stacked "vertically" and the terminal would need to maintain multiple mobility states. The consequence thereof would be that the overhead on the radio link would increase, since both mobility solutions require signaling in order to be able to maintain the mobility state. Another disadvantage is that the complexity on the core network side also would increase since new protocols and procedures would have to be supported in addition to already existing procedures and protocols.

It is hence, today, not possible for a user to change access system during an ongoing session without loosing the session, for example if changing from a WLAN hotspot to a 3G access on leaving the hotspot or vice versa, or if he wants to change from a WLAN or a 3G system or another system to a fixed broadband access for example when going indoors or vice versa, without loosing the session. Thus, there is a general problem that needs to be solved, since there are, today, different access technologies available which are appropriate for different prevailing conditions and there are also available dual or multimode mobile user stations, but there is not provided for a possibility to change from one access system to another, hence in an optimal way take advantage of what actually exists on the market, without loosing ongoing sessions or access to applications etc.

SUMMARY OF THE INVENTION

What is needed is therefore a network architecture that offers and supports multiaccess mobility. Particularly a network architecture is needed which enables integration of multiaccess systems and which allows for handovers between different access systems or access systems using different access technologies while still maintaining ongoing sessions, i.e. which allows session continuity, and which allows handovers between different access system without interruption of ongoing services or accessed applications.

Particularly a network architecture is needed which provides convergence of fixed and wireless networks, and even more particularly a network architecture is needed which supports integration of multiple access technologies, 3GPP as well as non-3GPP access technologies, for example including 2G, 3G, S3G as well as fixed broadband accesses such as xDSL, public Ethernets, WLANs, WiMAX etc.

Most particularly an application independent mechanism or a network architecture is needed which allows an end user to be reached and to reach services through a long term stable IP-address also when changing point of attachment between different access types, i.e. when changing from one access network technology to another, for example during ongoing sessions. Particularly packet data session continuity or IP mobility for unicast is needed when moving within and between different access types. As an example an arrangement or a network architecture is needed that allows an end user to be attached to for example a UTRAN when going indoors and e.g. deciding to put the user equipment or user station at a holder, for example for battery loading purposes and/or for using a loadspeaker etc., thus for example connecting to the network via a broadband ADSL installed, without loosing the session. Vice versa a user might also want to take his user equipment out of the stationary holder and go outdoors without loosing the session. Other particular cases relate to leaving or entering WLAN hot spots or similar from fixed broadband connections or 3G connections or any other connections. A generally applicable solution is needed. Particularly a network architecture is needed which is cheap and easy to build, use and implement for operators, application or service providers as well as for end users.

A core network node is therefore also needed through which one or more of the above mentioned objects can be achieved. Still further a mobile user station is needed through which one or more of the above mentioned objects can be achieved and which can be used. Still further a method is needed for providing support of dual or multi access between different types of access networks particularly without loss of session continuity etc. and, generally, through which one or more of the above mentioned objects can be achieved.

Therefore a network architecture as initially referred to is provided in which said, or at least some of said packet data gateway access support nodes, in the following simply denoted GASNs, are adapted to be capable of assigning an IP-address to an accessing mobile user station, whereby particularly each of said GASNs has at least one access type dependent or specific interface to at least one type of access network. At least said GASNs are adapted to support communication with each other over a mobility protocol interface such that a first or new GASN receiving a request for change of access type from a mobile user station is adapted to establish information about which previous packet data GASN the mobile user station is or was accessing over before the change, or generally, be able to establish mobile user station related information. Such new GASN is adapted to, using the established information about the mobile user station or more particularly about the user, update an established communication context concerning the mobile user station for the previous GASN or alternatively creating a new communication context concerning the mobile user station with the first GASN, such that mobility between different access network types is enabled for a mobile user station without interruption of an ongoing session.

In one implementation one or more of said GASNs is or are adapted to support access over more than one access network type, i.e. can handle different access technologies. Alternatively one or more of said GASNs is/are dedicated for access over a particular access network type. In a network comprising one or more core networks, there may also be GASNs either having all or one dedicated interface(s) or a dedicated interface for different access types in any combination. Particularly each GASN is dedicated for access over a particular access network type, or there is one, or a limited number of GASNs for each access type.

In one embodiment a previous GASN is adapted to support the access at least over a WLAN and/or WiMAX and/or a fixed broadband access network, for example (x)DSL, and/or a public Ethernet and/or 2G or a 3G or a S3G access network and said new or first GASN is adapted to support access over at least one or more of the above mentioned access networks, at least one being different from that/those of the previous GASN.

In one implementation a GASN may comprise a modified GGSN (Gateway GPRS support node) with an extended functionality or it may be particularly modified or extended in so far that it has a particular access type dependent or specific interface and is capable to establish user information about previous GASN, and supports intercommunication with other GASNs as discussed above. It may also comprise a modified CGSN (Combined GPRS Support Node) providing the above mentioned functionalities. For example some of the SGSN (Serving GPRS Support Node) functionality within the CGSN may be implemented in a 3G radio network control node RNC or similar of the access network instead.

Particularly at least one of said GASNs comprises a modified (as discussed above) PDG (Packet Data Gateway) supporting at least WLAN and/or WiMAX access.

A GASN may also comprise a modified PDG supporting fixed broadband access or even more particularly a modified BRAS (Broadband Access Server).

Particularly a previous GASN is adapted to act as an anchor point for a user connection after handover between different access type networks, i.e. after handover to another GASN if still needed. Particularly that anchor point handles policy and charging functionalities etc.

In one implementation the network architecture comprises at least two core networks and multiaccess handover is supported also between core networks. A previous GASN may then be provided in a first core network, e.g. a home core network, for a mobile user station whereas the new GASN may be provided in a second core network, e.g. the home core network of the mobile user station or vice versa. The inventive concept is also applicable if a mobile user station is roaming between two visited core networks.

Particularly the intercommunication mobility protocol comprises GMM (GPRS Mobility Management)/GTP. Most particularly the IP-address allocated to the user of a mobile user station is kept, i.e. not affected, by a handover between different access systems or different types of access systems.

In one implementation one of the access networks comprises a WLAN or a WiMAX or a fixed broadband access network and the respective access type dependent interface comprises an interface for setting up an IP-sec tunnel between the mobile user station and a GASN, said GASN for example at least comprising a modified PDG/TTG (Tunnel Terminating Gateway) or a BRAS respectively over an access node of the access network, for example a WAG (Wireless Access Gateway) or a DSLAM (DSL Access Multiplexer) respectively. Another access network may comprise for example a 3G access network, for example a UTRAN with an access network dependent interface comprising a GMM (/GTP).

As another alternative Mobile IP is used as intercommunication mobility protocol between GASN:s a new GASN and a previous GASN, of which one e.g. is a PDG/TTG. New MIP (Mobile Internet Protocol) Extension formats can easily be defined to transport the required information which currently are not defined for MIP, e.g. RAT (Radio Access Type), QoS (Quality of Service) negotiated (normally included in GTP) etc.

Most particularly a GASN is adapted to communicate with the HSS, for example HLR/AAA (Authentication Authorisation Accounting) server handling the mobile user station requiring access mobility in order for the new GASN to establish the previous GASN address or identity. In an alternative implementation, in order to establish information about the address of the previous GASN, it is supposed that routing areas also have been specified for, for example, WLAN and/or fixed broadband access networks in order to allow for a GPRS ISRAU (Inter SGSN Routing Area Update) procedure to be implemented for informing a GASN about previous GASN. In still another implementation it is supposed that the information about previous GASN is included in a message or in the access request from the mobile user station when the mobile user station requests interaccess system handover.

In a particular implementation the network is adapted to, upon handover from one access system to another for a mobile user station, create a route between the mobile user station and the new GASN via the previous GASN, which hence forms an anchor (point) GASN. In a particular implementation the established communication context is a PDP context and said PDP context is updated or a new PDP context is established upon handover from one access system to another.

In a Mobile IP implementation, instead of updating (setting up a new) PDP context, a MIP registration is requested from the previous GASN, which responds to the request. When performing a handover from e.g. UTRAN (or generally a 3G access network) to e.g. a WLAN (or fixed broadband access network), and an IP sec tunnel is set up, preferably this includes agreeing about a secure association before the tunnel is set up, and an IP address is given. As an example IKE exchange is used, and a tunnel is set up based on keys. Alternatively a tunnel is set up first, without assigning an IP address, or a temporary IP address is first given which is replaced by the "original" one. As long as the "same" IP address can be used, tunnel set up can be done in different manners.

The invention therefore also provides a core network node as initially referred to which is adapted to be capable to assign an IP-address to accessing mobile user stations. It has at least one access type dependent or specific interface at least for one type of access networks. Further it has a mobility protocol interface supporting communication with other packet data gateway access supporting nodes and it is adapted to, for establishing information about which was the previous GASN for a mobile user station requesting access, or even more particularly about the user of a mobile user station or related information. Further it is adapted to, using the established information, update an established communication context concerning the mobile user station from the previous GASN or, alternatively creating a new communication context concerning the mobile user station such that mobility between different access types, i.e. different access systems using different access technologies, is enabled for a mobile user station without interruption of or affecting an on-going session or service. Alternatively it may support sending a request for MIP registration from a previous GASN, in case mobile IP is used.

In one implementation the GASN is adapted to support access of more than one access type, i.e. it has at least two different access type dependent interfaces to at least two different access network types. Alternatively it has only one access type dependent or specific interface to one specific access network type. In one implementation it has an access type dependent interface supporting WLAN/WiMAX access. Most particularly it then comprises a modified PDG (Packet Data Gateway)/TTG (Tunnel Terminating Gateway) modified such as to provide the features referred to above. Alternatively or additionally it has an access type dependent or access type specific access interface supporting fixed broadband access network access, for example xDSL. It may then for example comprise a modified BRAS. Still further, alternatively or additionally, it has an access type dependent interface supporting 3G or 2G radio network access, for example UTRAN access. It may then comprise a modified or extended GGSN or a modified SGSN for example with a limited functionality compared to a conventional CGSN for example in that some of the functionality, particularly at least part of the SGSN functionality of the CGSN, is moved to a radio network control node or similar, or a multiaccess edge node connected to a packet data node, for example a GGSN, an SGSN or a CGSN with the conventional or a modified functionality.

Preferably the core network node is adapted to act as an anchor point for a mobile user station having requested handover to another access network type or if it is the home GASN requesting multi-access handover from one "visited" GASN to another "visited" GASN. Most particularly the mobility protocol (between GASNs) is GTP. Alternatively Mobile IP (MIP) is used. The core network node (GASN) is particularly adapted to establish information about previous GASN through communication with the mobile user station HSS, particularly HLR/AAA. Alternatively it is adapted to retrieve information from a mobile user station request (at change of access type) concerning previous GASN. Still further, it is supposed that routing areas have been defined also for e.g. WLANs or fixed broadbands, and the GASN is adapted to use the GPRS ISRAU procedure to establish the previous GASN.

The invention therefore also provides a dual or multimode mobile user station supporting access using at least two different access network types to a core network. It comprises means for detecting loss of connection to an access system or for detecting an optional, available other access system of a different type that for some reason is to be presented as an option or considered to be better, and/or for detecting actual connection to another access system type, and means comprising an algorithm triggering transmission of an access system change request to such other access system type, said access request comprising information about previous access network type. However, it is not necessary that information about the previous access network type is provided but in some cases the provided information merely relates to there being a change of access types.

The invention also suggests a method as initially referred to, which comprises the steps of;

receiving an access request relating to access over a second, or new, access network in a core network node comprising a second (or new) packet data gateway access support node;

establishing information about the previous or first GASN over which the mobile user station previously was provided with access to the core network and/or the home GASN;

using a mobility protocol to, using said information about the previous node, update an existing, previous communication context, alternatively setting up a new communication context;

keeping the previous GASN or the home GASN of the mobile user station as an anchor point;

informing the mobile user station that the access is provided over said second or new access network, and hence providing the mobile user station with access over the new access network without interrupting or affecting an ongoing session.

Particularly the involved packet data gateway access supporting nodes communicate with mobile user stations or access nodes over respective access type dependent or access type specific interfaces. Particularly intercommunication between GASNs using the mobility protocol comprises using the GPRS GTP protocol modified to support such communication. Alternatively MIP is used.

In some embodiments the establishing step comprises; sending a request for the address of the previous GASN to the HSS (HLR/AAA) of the mobile user station from the second or new GASN. Alternatively the establishing step comprises establishing, from information contained in a message e.g. the access request message, from the mobile user station, the address or the identity of the previous GASN, or alternatively, supposing that routing areas are defined for all concerned access networks, implementing the GPRS ISRAU procedure to establish information about the address or the identity of the previous GASN.

Most particularly the method comprises the step of, after completed handover from one access system to another of another type, creating a route where the anchor GASN, i.e. the previous GASN, or the home GASN if they are not the same, is the new or second GASN. Even more particularly the method comprises the step of; keeping the same user IP address during handover between different access networks.

Particularly the method comprises the step of, preforming a handover from a previous type of access network to a new access network of a different access type or implementing a different access technology, said access networks comprising two different of the WLAN, WiMAX, fixed broadband network for example an(a) xDSL, a 2G, 3G or a S3G network or a public Ethernet etc.

The basic concept of the present invention is to provide multiaccess through enhancing and reusing existing technology. For example GPRS-intra system mobility is provided by GMM/GTP or MIP. With the extensions that are proposed, it will be possible to use the GTP/MIP protocol to fulfill the requirements for multi-access and mobility between different access technologies. According to the invention the user can for example roam between I-WLAN, Interworking WLAN, (fixed broadband) and 3G systems etc. while keeping session continuity. At least as far as access change between a 3G and a WLAN, or vice versa, is concerned, the concept is based on GTP and the I-WLAN 3GPP access specifications. Alternatively Mobile IP is used instead of GTP to provide control signaling and tunneling of user data between network nodes. It should however be noted that in that case Mobile IP is not used as specified by IETF, i.e. as a protocol between terminals and network mobility agents. Instead Mobile IP is solely used as a network protocol to replace GTP and it does not have to be supported by the terminals. It is also possible to use other protocols (mobility protocols) than GTP or MIP between the network nodes or GASN:s. Tunneling of user data will then be performed e.g. by one of the encapsulation protocols defined for MIP, e.g. IP-in-IP or GRE (Generic Routing Encapsulation). A mobile user station can re-use GMM also with other access types, e.g. WLAN and broadband.

BRIEF DESCRIPTION OF THE DRAWINGS

The invention will in the following be further described, in a non-limiting manner, and with reference to the accompanying drawings, in which.

DETAILED DESCRIPTION OF THE DRAWINGS

Figure 1:
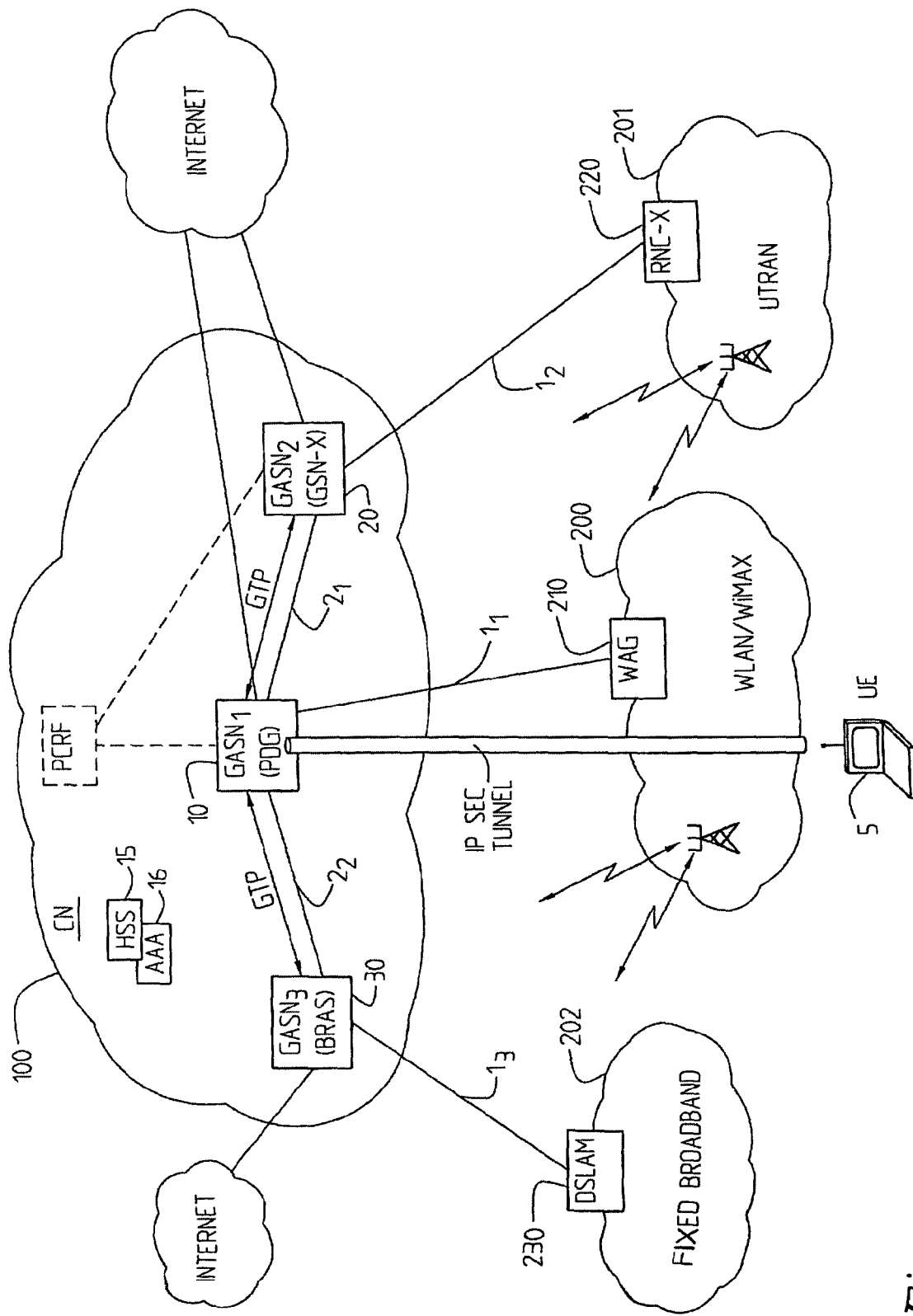
FIG. 1 schematically illustrates a core network and three different access networks implementing different access technologies and interfacing access type specific GASNs according the invention.

FIG. 1 shows one example of a network structure according to the present invention. It comprises here one core network 100 which comprises a number of core network nodes, here denoted GASNs. In the embodiment shown in FIG. 1 the core network 100 comprises a first $GASN_1$ 10 which has an access dependent or access specific interface $1_1$ to an access system which here is a WLAN/WiMAX 200, particularly to a WLAN access gateway 210 which is the access node which concerns the access network. $GASN_1$ 10 particularly comprises a PDG (Packet Data Gateway) modified according to the invention. It further comprises another GASN, $GASN_2$ 20, which has an access type dependent interface $1_2$ to a, here, GPRS/UMTS radio access network, UTRAN 201, i.e. to an access node in the radio access network which particularly may be a radio network control node RNC-X 220 which here means a conventional RNC modified according to the invention or modified so as to, for example, comprise some functionality which normally is provided in an SGSN (Serving GPRS Support Node), or if implemented, part of the SGSN functionality of a CGSN (Combined GPRS Support Node) normally including SGSN as well as GGSN functionality. $GASN_2$ 20 is a modified GSN (GSN-X) in that it, in addition to support access specific interfaces to access networks and intercommunication with other GASN:s and HSS for returning previous access node address information etc. as will be discussed below, also may comprise the, or most of the, GGSN functionality, possibly some of the SGSN functionality, or particularly the SGSN functionality that is not provided for in the RNC-X 220 or correspondingly the GGSN part of a CGSN functionality and some of the SGSN functionality of a CGSN etc. The core network 100 further comprises another $GASN_3$ 30 which has an access type dependent interface 13 to the access node DSLAM (DSL Access Multiplexer) 230 of a fixed broadband access network 202. $GASN_3$ 30 and DSLAM 230 may also be modified as discussed above or in some other appropriate manner. GASNs 10, 20, 30 e.g. provide access to external packet data networks, such as for example Internet or generally a third party controlled packet data network.

Mobility providing interfaces are provided between the respective GASN:s 10, 20, 30; here the interfaces are denoted $2_1$, $2_2$. Particularly said mobility interfaces $2_1$, $2_2$ comprise GTP (GPRS Tunneling Protocol) interfaces, here for example between a modified PDG/TTG 10, a GSN-X 20 and a modified BRAS 30 which are used for multiaccess handover. As discussed earlier in this application, e.g. Mobile IP can be used as an alternative to GTP to provide control signaling and tunneling of user data between the GASNs of concern. It is here supposed that mobile user station or user equipment 5 accesses $GASN_1$ 10, particularly, a PDG or a TTG, over WLAN 200 according to the 3GPP I-WLAN specification comprising the setting up of an IP-sec tunnel between UE 5 and $GASN_1$ 10. For GPRS there may be an SGSN or not depending on which 3GPP release that is considered or used. The inventive concept covers both alternatives.

According to the inventive concept the end user, for example UE 5, should keep his IP-address during inter-access system handover i.e. if there is a handover, e.g. to UTRAN 201 or a fixed broadband 202 from the WLAN or in the other direction, i.e. for any handover between different access networks. It is further supposed that the mobile user station is a dual mode or multimode user station, for example a UTRAN and WLAN capable user station. Simultaneous access is not required but it can be implemented for "make before brake" optimized performance.

In an advantageous embodiment policy and charging is handled in the anchor GASN as will be described more thoroughly below. As can be seen in FIG. 1 the core network also comprises a HSS 15 (Home Subscriber Server) with an AAA server 16. Also a PCRF node is illustrated handling the policy and charging functionalities etc.; this is however merely indicated through dashed lines since it is not of any particular relevance for the present invention, and it can be handled in different manners.

The GASN with which a user is first connected, here $GASN_1$ 10, particularly a modified PDG/TTG, shall remain anchor point of a multi-access handover, although in roaming cases generally the anchor point remains in the home CN.

In this case, i.e. if the user makes a handover to UTRAN 201 or to the fixed broadband 202, there will be two GASNs involved in the path through the core network 100. Therefore the old or previous GASN needs to be found after the handover, i.e. in this case the old GASN would be $GASN_1$ 10. As will be described more thoroughly below, the old or previous GASN can be found in different manners and the inventive concept is not limited to any particular way of establishing the previous GASN, but covers any way of establishing the previous GASN, and three examples will be given. According to a preferable implementation the old (previous) GASN is found via HSS 15 and AAA 16 as will be more thoroughly described with reference to FIGS. 2B and 3B. In an alternative implementation the previous GASN can be found supposing that routing areas also are specified for example for WLAN and fixed broadband access networks, through using the GPRS ISRAU method. According to a third alternative embodiment the mobile user stations could be provided with information about the address of the previous GASN and send this information to the new GASN at handover. This method is however sometimes less attractive, since operators are reluctant to expose details about their networks, for example node IP-addresses.

These methods are also covered by the inventive concept as well as other possible methods but the following examples will show embodiments comprising HSS (HLR)/AAA communication.

Figure 2A:
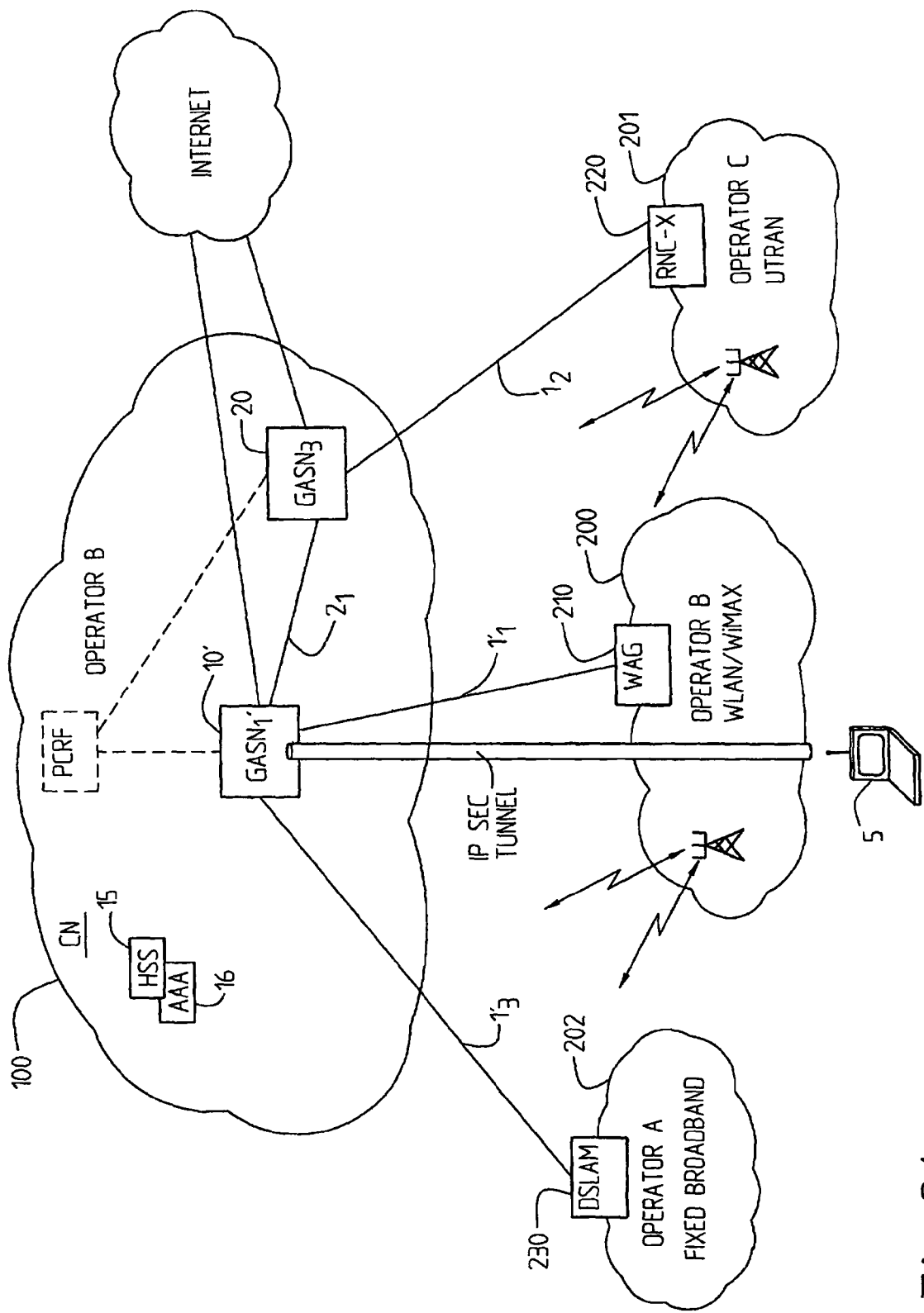
FIG. 2A illustrates a core network and three access networks, wherein the user is provided with public WLAN access.
Figure 2B:
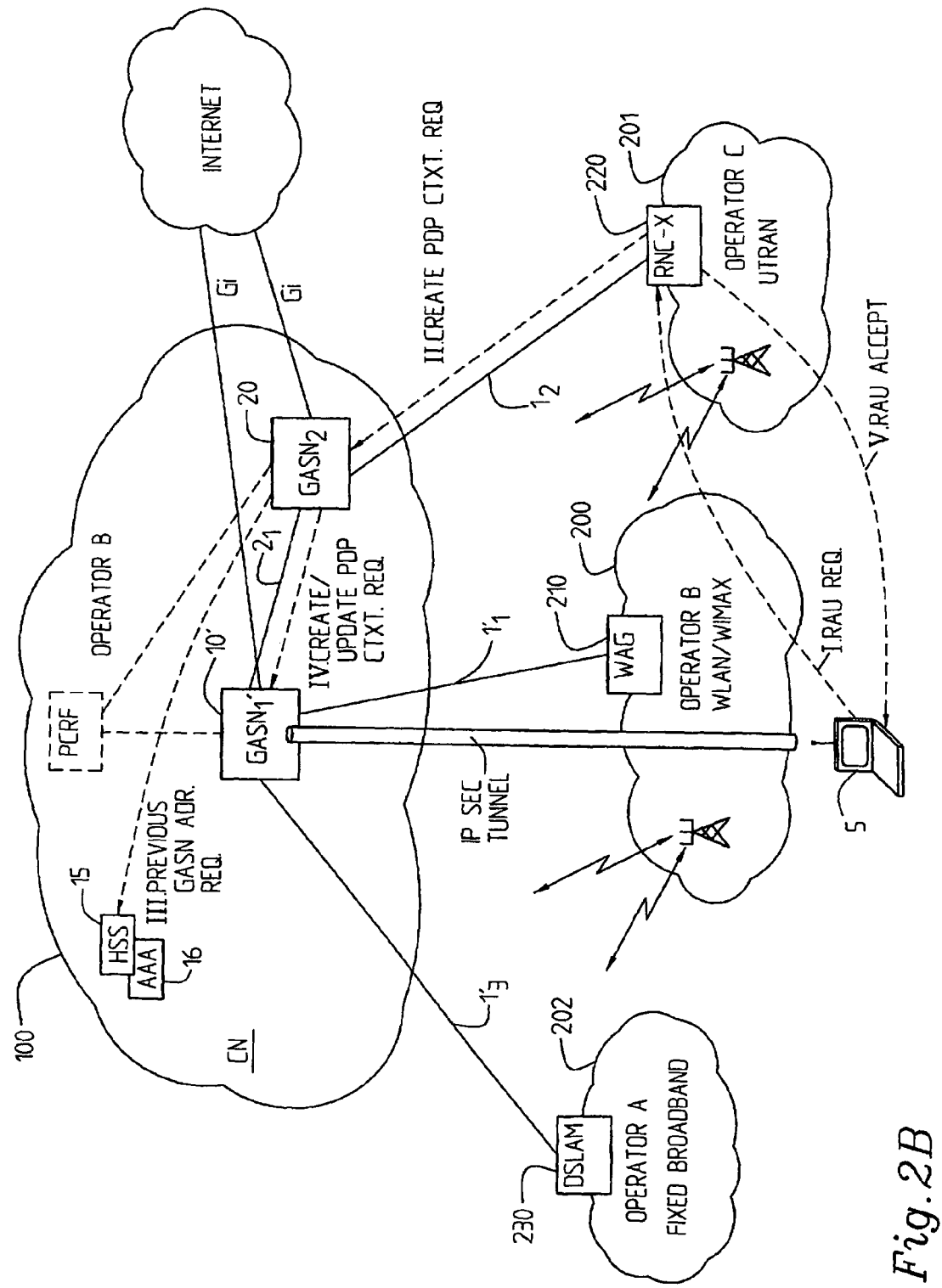
FIG. 2B illustrates the handover procedure for the user in FIG. 2A when requesting UTRAN access instead.
Figure 2C:
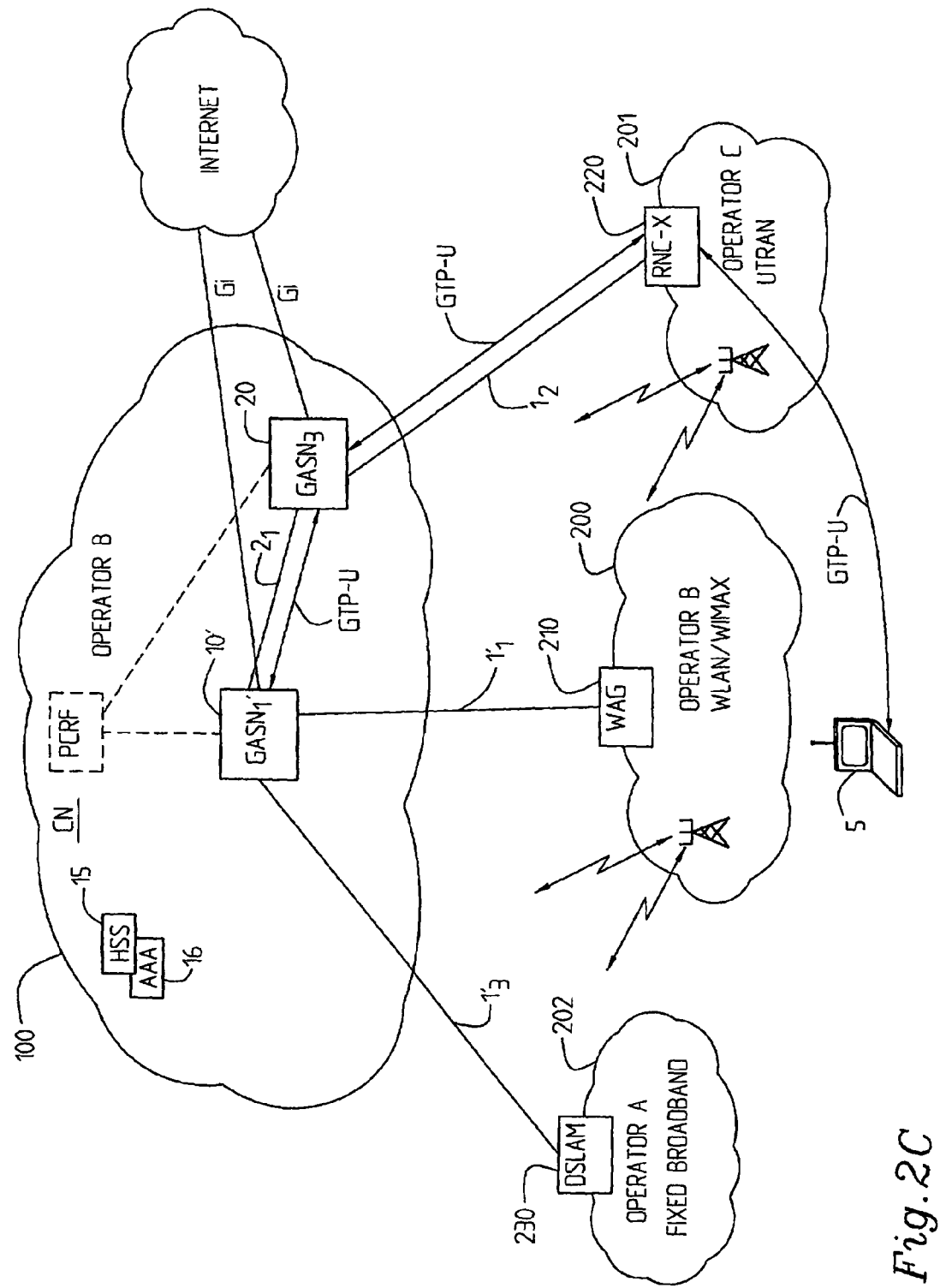
FIG. 2C illustrates provisioning of UTRAN access for the user of FIGS. 2A and 2B.

The block diagrams in FIGS. 2A-2C describe the procedure when end user station 5 makes a handover from WLAN access to GPRS/UTRAN access. It is hence supposed, in FIG. 2A, that end user 5 is attached to I-WLAN i.e. attached through WLAN 200 to WAG 210 as in FIG. 1 to $GASN_1'$ 10' over an access type dependent interface $1_1$ and an IP-sec tunnel is set-up between end user 5 and $GASN_1'$ 10'. The respective figures are similar to FIG. 1 with the difference that $GASN_1'$ 10' has two dedicated or access type dependent interfaces, namely interface $1_1$ to WLAN 200 and interface $1_3'$ to the fixed broadband 202 (operated by operator A). Here WLAN is operated by operator C and UTRAN by operator B, also responsible for the core network 100. In this respect FIG. 2A is similar to FIG. 1, although it does not have to be different operators, or not different operators as shown, and the core network does not have to have the same operator as UTRAN 201 etc.

FIG. 2B is similar to FIG. 2A, but it is here supposed that the user 5 attached to I-WLAN 200 via an IP-sec tunnel which has authenticated and has access to 3G services for example looses contact with the WLAN system 200 or for some other reason decides to make a handover to 3G. As will be explained, a modified routing area update will take place. In this embodiment a case is illustrated where the involved 3G system does not have a SGSN, and a GASN wherein part of the SGSN functionality is moved to RNC-X 220. A case with a legacy 3G system including a SGSN would be similar.

Hence, it is here supposed that a routing area update request, I, is sent using GMM signaling to RNC-X 220. Subsequently RNC-X 220 sends a create PDP context request, II, over the access type dependent or specific interface $1_2$ to $GASN_2$ 20. $GASN_2$ 20 then needs to know the address of the previous GASN to which the mobile end user station 5 was connected and therefore sends a request to HSS/AAA 15', 16 using a Radius or Diameter protocol, III. When the requested information has been provided to $GASN_2$ 20, i.e. when $GASN_1'$ 10' has the address of the previous GASN, $GASN_2$ 20 sends a create (or, here update, PDP context request), IV, to $GASN_1'$ 10'. The procedure will be explained more in detail below with reference to the sequence diagrams in FIG. 5 or FIG. 6.

Finally a routing area update accept, V, is sent (via $GASN_2$ 20) from RNC-X 220 to the mobile user station 5 (GMM signaling). In the communication between the GASNs, GTP or MIP may e.g. be used. Preferably resource control functions are handled by PCRF before as well as after the handover. When the handover is completed, a route is created via the anchor GASN, here $GASN_1'$ 10' and the new GASN, i.e. $GASN_2$ 20, to the mobile user station 5.

FIG. 2C finally illustrates the access to UTRAN 201. Access for mobile user station 5 user plane traffic is provided via two GASNs in the local core network 100, namely new $GASN_2$ 20 and $GASN_1'$ 10', forming an anchor point, over GTP-U as illustrated in the figure between mobile user station 5 and RNC-X 120, and RNC-X 120 and GASN 20, as well as between GASN 20 and GASN 10'. Furthermore, GASN 20 may for instance comprise an extended GGSN i.e. a GGSN with an extended functionality according to the present invention or a CGSN also extended according to the present invention but where some of the SGSN functionality may or may not be transferred to the possibly correspondingly modified RNC-X 220.

Figure 3A:
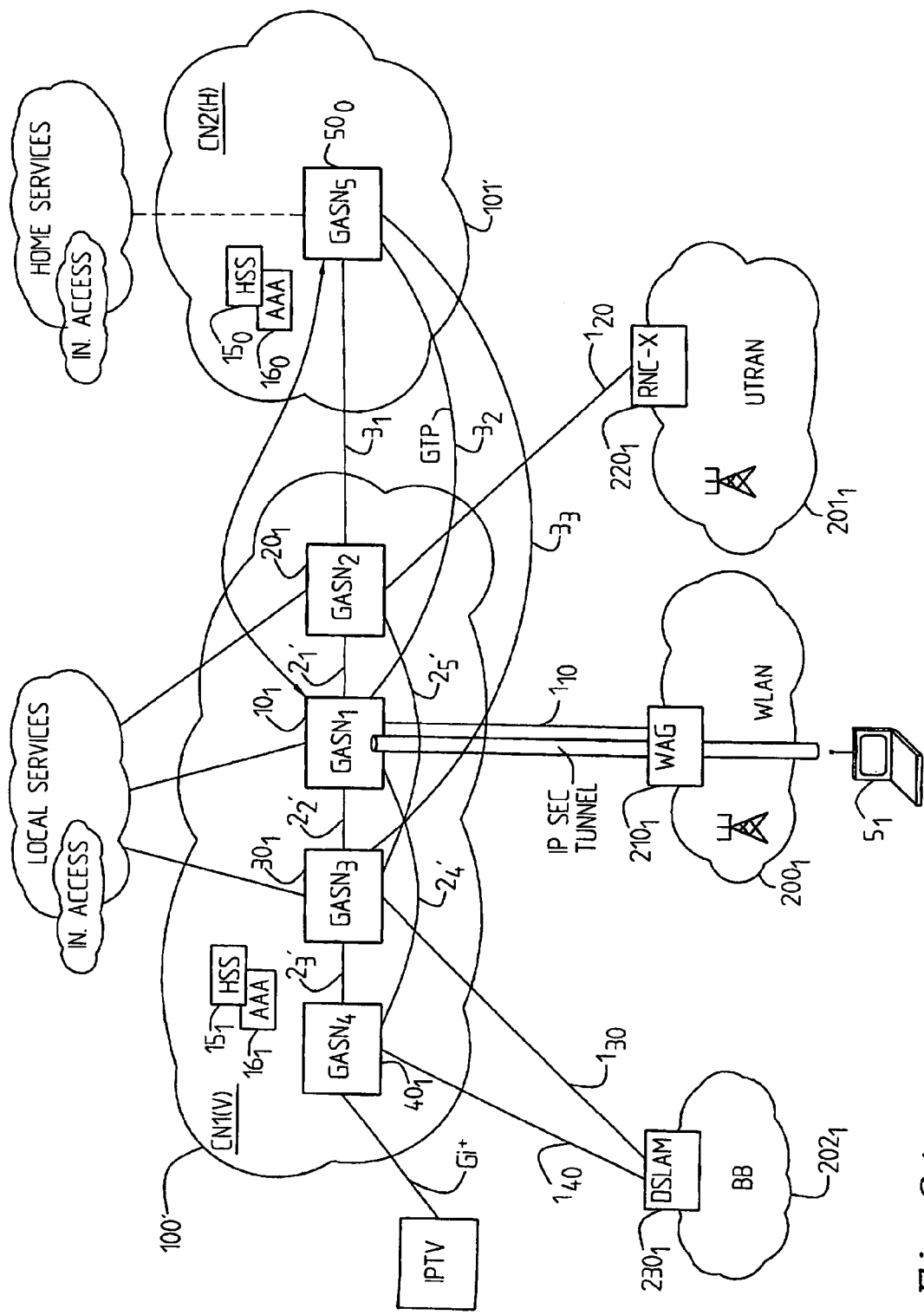
FIG. 3A illustrates a user accessing a (visited) core network over a public WLAN which is not the own core network (CN) of the user and who will request access to an UTRAN of the visited CN.
Figure 3B:
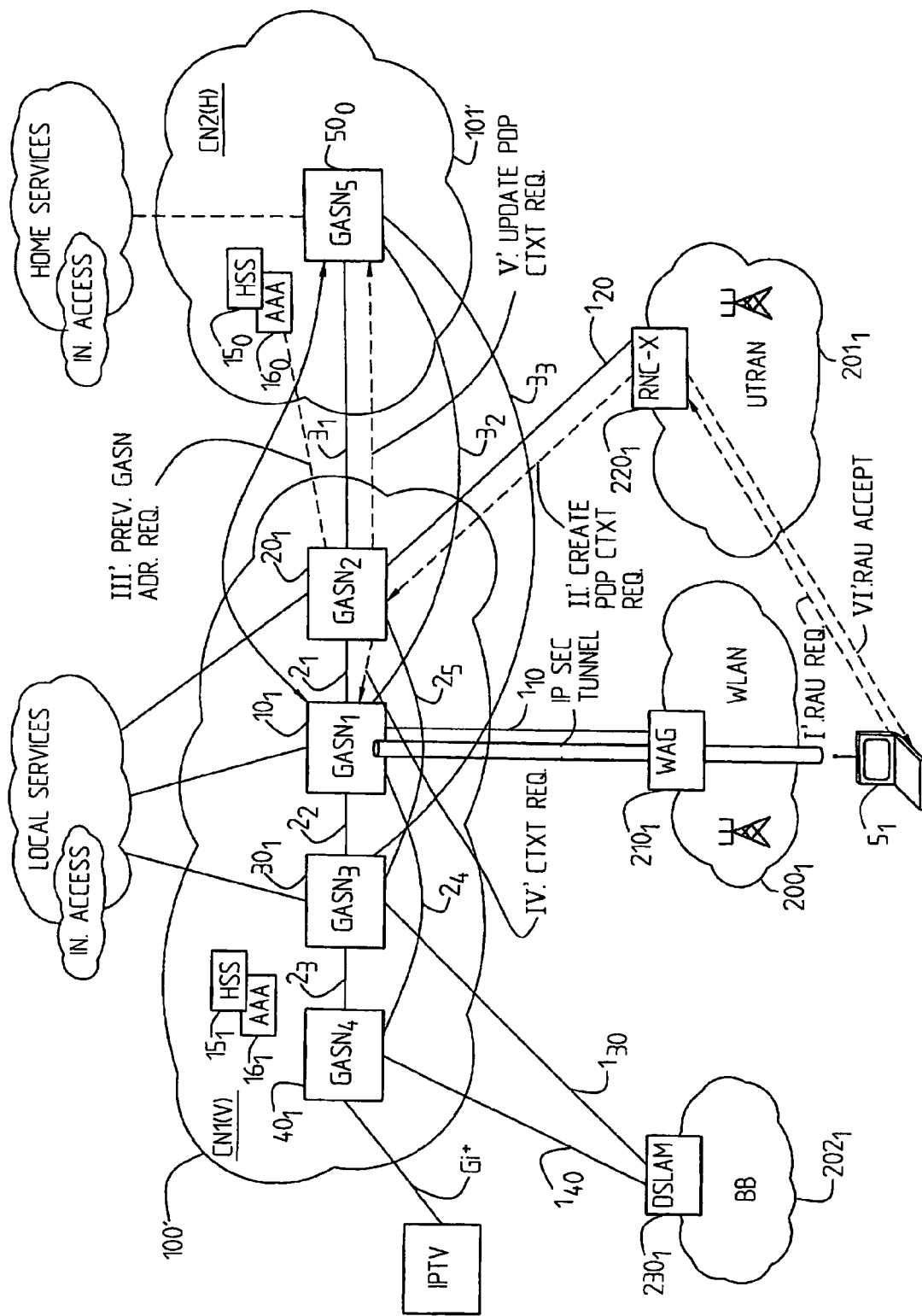
FIG. 3B illustrates the handover procedure for the user of FIG. 3A.
Figure 3C:
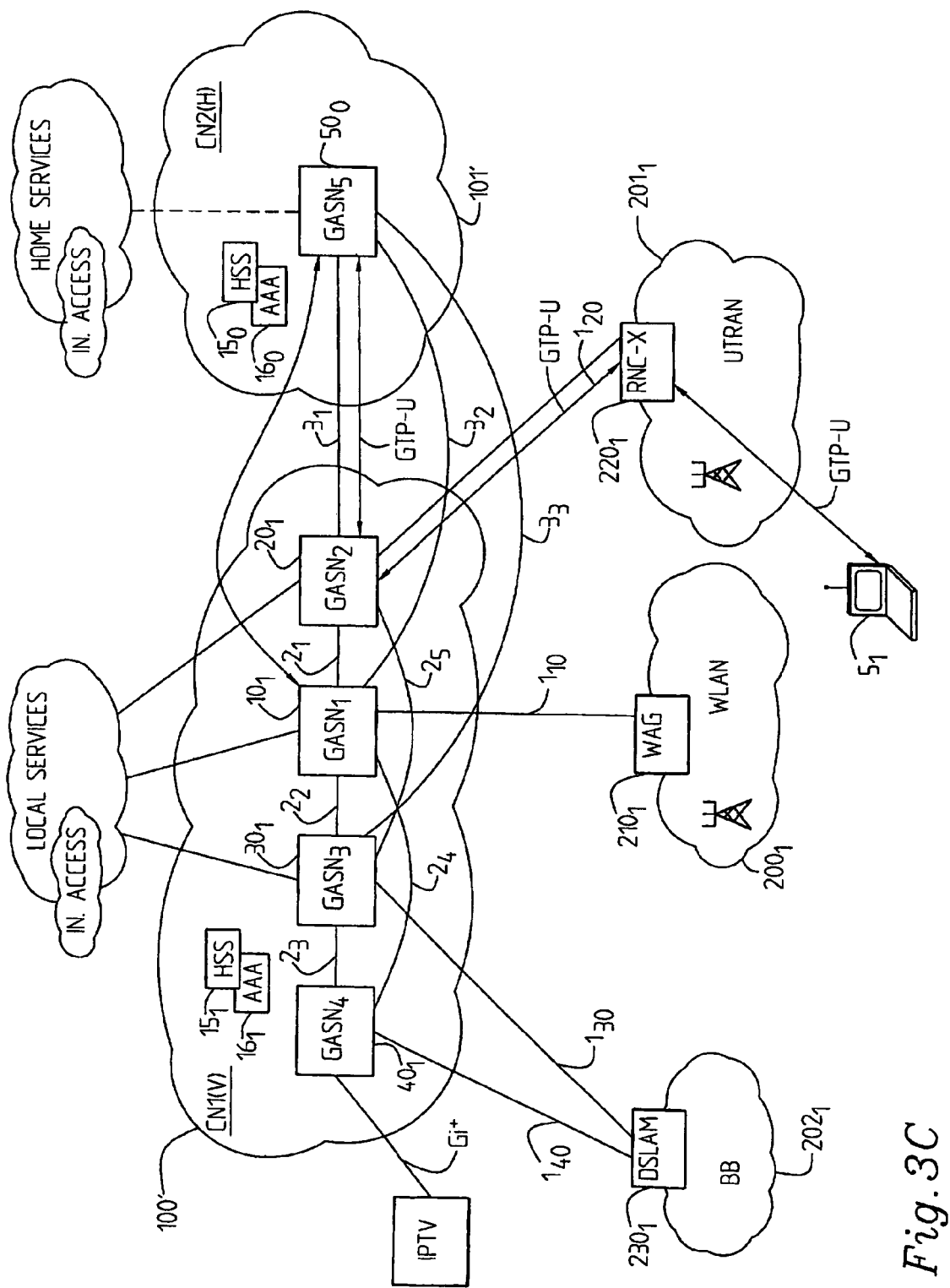
FIG. 3C illustrates the provisioning of the UTRAN access for the user of FIGS. 3A, 3B, FIG. 4 schematically illustrates a core network and access networks wherein a user accesses the core network over a fixed broadband access network.

FIGS. 3A-3C are figures similar to FIGS. 2A-2C but instead describing an example of a roaming case from one GASN to another GASN using inter-access technology according to the present invention for a handover when the anchor point is in a home core network, here CN 2(H) 101'. The visited core network is here denoted CN 1 (V) 100'.

In this case of roaming access is changed from public WLAN access to UTRAN access and the access networks are both connected to the visited core network 100'. The inventive concept of course also applies to other cases of roaming e.g. from access over an access network of a first core network to for example an access network using a different technology but connected to another core network where both may be visited networks or either of them may be a home core network; the functioning is similar. Generally, if a local anchor point is used in the VPLMN, the functioning will be similar to what will be described for example with reference to FIG. 5. If a local anchor point is not used in the VPLMN (Visited Public Land Mobile Network), the method will still be similar but may also have some elements similar to a GPRS ISRAU.

The home anchor GASN will remain while the serving GASN is switched from the previous GASN to the new GASN.

Hence, in FIG. 3A it is illustrated a visited core network 100' and a home core network 101', i.e. a home core network for the mobile user station $5_1$. The visited core network 100' comprises a number of GASNs, namely GASN 1 $10_1$ having an interface to WLAN $200_1$, i.e. an access network type dependent interface $1_{10}$, GASN 2 $20_1$ for UTRAN $201_1$ access via RNC-X $220_1$ over the access type dependent interface $1_{20}$, GASN 3 $30_1$ with access type dependent interface $1_{30}$ to DSLAM $230_1$ of fixed broadband network $202_1$. There is also a further GASN 4 $40_1$ with a Gi+interface to IP TV. It also has a type dependent interface $1_{40}$ to DSLAM $230_1$. GASN:s $10_1, 20_1, 30_1, 40_1$ communicate with each other over interfaces $2_1', 2_2', 2_3', 2_4', 2_5'$ using a mobility protocol as discussed above with reference to the preceding figures (e.g. GTP or MIP). Illustrated are also HSS $15_1$ and AAA $16_1$. The home network CN 2 101' is here only schematically illustrated and only GASN $5_0$ $50_0$ is illustrated, although also this core network generally has more GASNs. Also illustrated are, as for the core network 100', a HSS $15_0$ and AAA $16_0$. The GASN:s $10_1, 20_1, 30_1, 40_1$ are connected respectively to GASN $50_0$ of CN 2 101' over roaming interfaces $3_1, 3_2, 3_3$ over which e.g. GTP tunnels can be set up. It is also here supposed that mobile user station $5_1$ accesses over WLAN 201 and an IP sec-tunnel over the interface $1_{10}$ is set up to GASN 1 $10_1$. Provisioning of local services and home services respectively merely is schematically illustrated in the figure and it is actually not a part of the present invention.

FIG. 3B is similar to FIG. 3A but it is now supposed that the mobile user station $5_1$ for some reason as explained wants or needs access over UTRAN 201 instead. Mobile user station $5_1$ therefor sends a routing area update request to RNC $220_1$, I', which thereupon sends a create PDP context request to GASN 2 $20_1$ over the access type specific interface $1_{20}$, II'. GASN 2 $20_1$ then, as described with reference to FIG. 2B, needs to know or get information about the previous GASN address, and therefore sends a previous GASN address request, III', using the mobility protocol, here over a roaming interface, to HSS/AAA $15_0, 16_0$ of the home core network 101' which is the home network of mobile user station $5_1$. At reception of the needed information, GASN 2 $20_1$ sends a context request to GASN 1 $10_1$ which was the previous GASN, IV'. The update PDP context request (or create PDP context request) is sent from GASN $20_1$ to GASN $50_0$, V', and the GTP tunnel (here) is moved from being between the previous GASN $10_1$ and GASN $50_0$ to being between GASN $20_1$ and GASN $50_0$. Finally a routing area update accept is sent from RNC $220_1$ to the mobile user station $5_1$, VI'. FIG. 3C, which is similar to FIG. 3B simply illustrates the UTRAN access with the GTP (here) tunnels between the mobile user station $5_1$ and RNC $220_1$, between RNC $220_1$ and GASN 2 $20_1$, and GASN 2 $20_1$ and GASN 5 $50_0$ respectively, the anchor point hence being the GASN $50_0$ of the home core network 101'.

Figure 4:
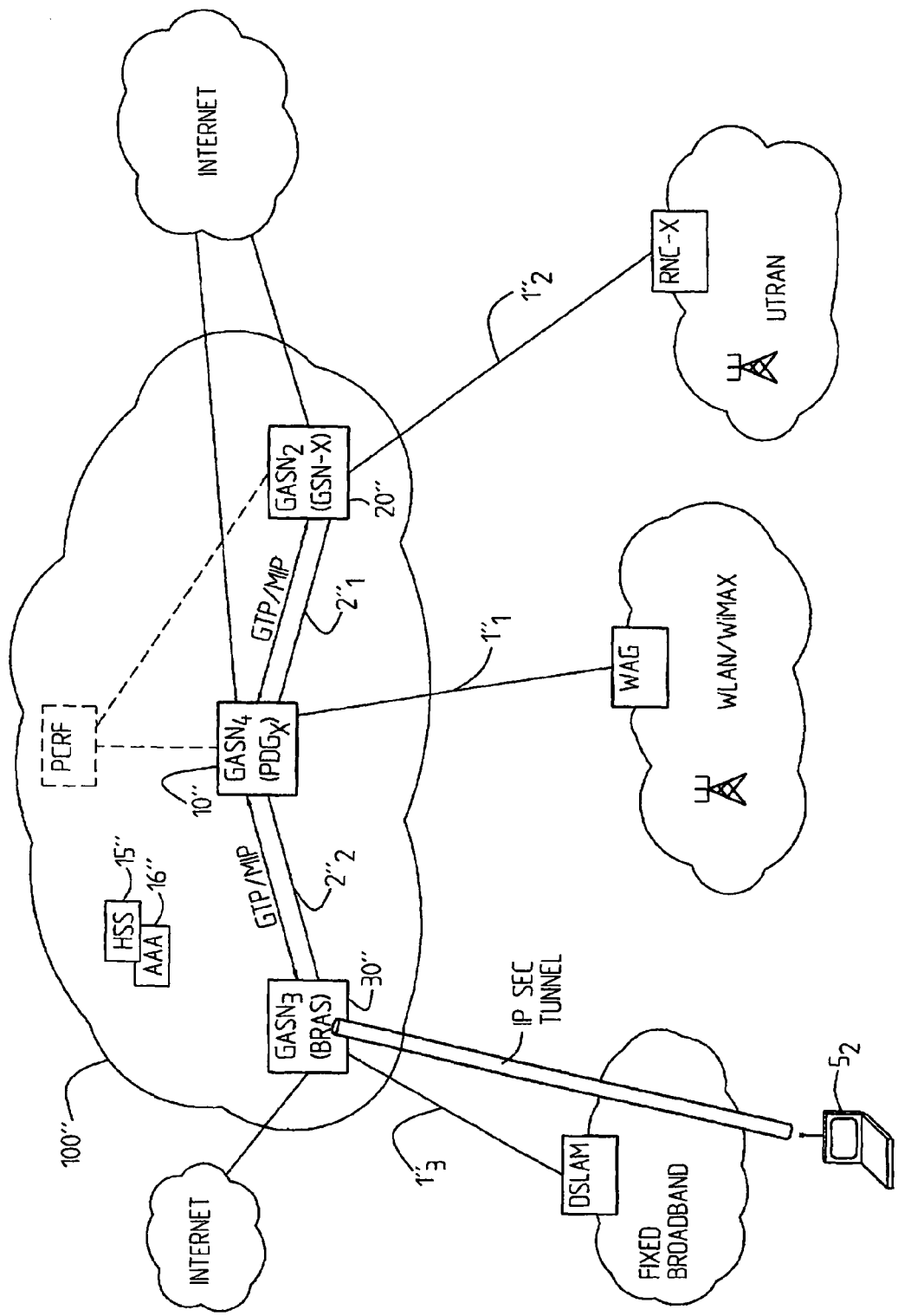

FIG. 4 is a simplified block diagram similar for example to FIG. 1 with a core network 100" that can be accessed by means of three different types of accesses, namely over UTRAN with a number of RNCs, RNC-X illustrated in the figure, by WLAN access where the WLANs comprises WAG:s and over a fixed broadband with a DSLAM. The core network 100" comprises GASN 10", for example an extended PDG, PDGX, with an access type specific interface $1_1"$ to WAG of WLAN 210", a GASN 20" with an access type specific interface $1_2"$ to RNC-X of UTRAN 220" and a GASN 30", e.g. a modified BRAS (Broadband Remote Access Server), with an access type specific interface $1_3"$ to DSLAM of a fixed broadband 230". It is here supposed that an IP sec-tunnel is set up between the end user station $5_2$ and $GASN_3$ 30". This figure is merely intended to show that also non-3GPP access technologies shall be covered. Such systems may be fixed broadband access networks, for example an ADSL connection in the home. It is here supposed that a specific GASN/BRAS in the core network provides of the operator access. Particularly the $GASN_3$ 30" is built up on a PDG (providing WLAN access) and the same mechanisms are used as for I-WLAN, i.e. an IP Sec tunnel is set up between the mobile user station $5_2$ and $GASN_3$ 30". With these assumptions, the same multi-access handover procedures as used for I-WLAN to UTRAN handover and as explained above are applicable. The figure also illustrates the (GTP) tunnels set up using the mobility protocol between the different GASN:s.

Figure 5:
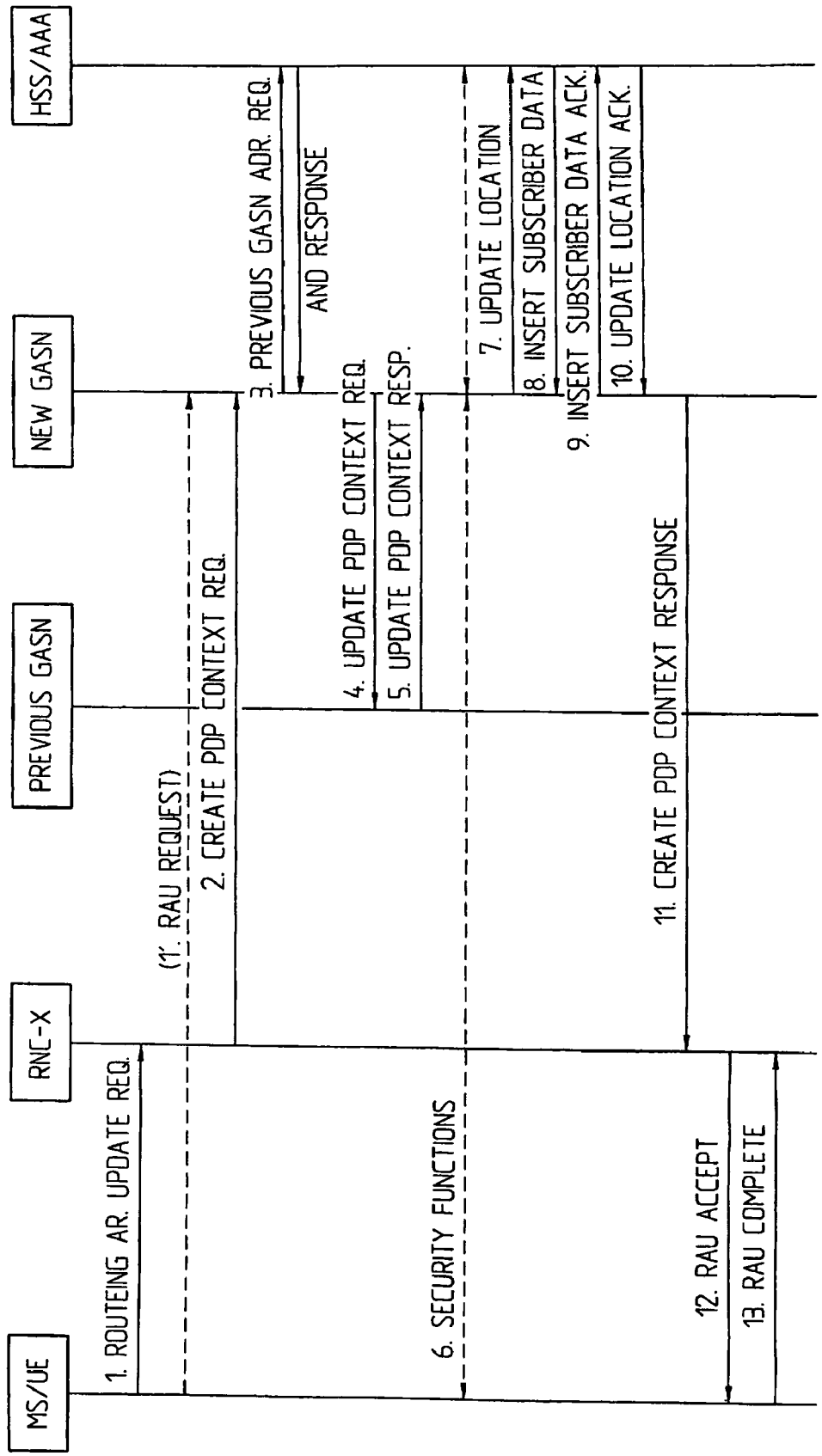
FIG. 5 is a sequence diagram illustrating the procedure when a user changes access from WLAN to UTRAN according to a first embodiment.

FIG. 5 is a sequence diagram describing how a handover from WLAN to GPRS/UTRAN can be performed according to one embodiment of the invention using GTP as a mobility protocol. It is here supposed that the user is attached to I-WLAN and hence authenticated and having access to 3G services but for some reason needs to make a handover to 3G/UTRAN. An RRC (Radio Resource Control) connection is or will be established. It is then supposed that a routing area update (RAU) request is sent from MS/UE to RNC-X, which is a modified RNC that supports the functions according to present invention, 1. The RAU message may contain IMSI, Update Type, . . . to RNC-X. Update type shall e.g. somehow indicate "update from WLAN access" or similar. In this case the parameters such as P-TMSI, VLR TMSI, P-TMSI Signature, old RA etc. may be empty. Subsequently, 2, RNC-X sends a create PDP context request to new GASN. New GASN selection could for example be policy based and provided by means not covered by the present invention. The MS/UE indicates that IP-address is not requested. The routing area update request message may be piggybacked up to the new GASN and handled therein. A routing area update request may alternatively, 1', be sent directly from MS/UE to the new GASN in an alternative implementation.

In the next step, 3, the new GASN requests the address of the previous GASN from HSS/AAA in this implementation, and receives a response. As discussed earlier in the application, the routing area update request may contain an identifier, for example NAI (Network Address Identifier), RAI (Routing Area Identifier) etc. of the old GASN, e.g. PDG/TTG, such that the new GASN can find it without having to contact the HSS/AAA. Subsequently, 4, the new GASN sends an update PDP context request (e.g. with new GASN address, QoS Negotiated, Tunnel Endpoint Identifier, serving network identity, CGI (Cell Global Identifier)/SAI (Service Area Identifier), RAT type) to the previous GASN. Alternatively a create PDP context message may be used since the old GASN did not actually have an old GTP tunnel but rather an IP-sec tunnel to the MS/UE. However, the previous GASN remains anchor point. Previous GASN then sends an update PDP context response, if an update PDP context request was sent, to the new GASN, 5. Security functions may optionally be executed, 6. The new GASN informs the HSS about the change of GASN by sending an update location with e.g. GASN number, GASN address, IMSI, IMEISV to the HSS, 7. It should be clear that possibly not all this information is required and the IMEISV (International Mobile Equipment Identifier Software Version) is sent preferably only if the ADD (Automatic Device Detection) function is supported.

HSS sends Insert Subscriber Data, for example with the IMSI, subscription data, to the new GASN, 8, which validates the presence of the MS/UE in the (new) routing area. The new GASN constructs a MM (Mobility Management) context for the MS/UE and returns an Insert Subscriber Data Acknowledgement message (for example with IMSI) to the HSS, 9, which acknowledges the update location by sending an update location acknowledgement (IMSI) to the new GASN, 10.

The new GASN then sends a create PDP context response (for example with P-TMSI, VLR TMSI, P-TMSI Signature) to RNC-X, 11. The routing area update response message may be piggybacked from the GASN, i.e. the new GASN, if handled by the GASN (new), 11.

Finally the RNC-X responds (or forwards transparently if handled in the new GASN) to the MS with a routing area update accept (e.g. with P-TMSI, VLR TMSI, P-TMSI Signature etc.), 12, and the MS/UE finally confirms the reallocation of the TMSI:s by returning a routing area update complete message to RNC-X, 13.

Figure 6:
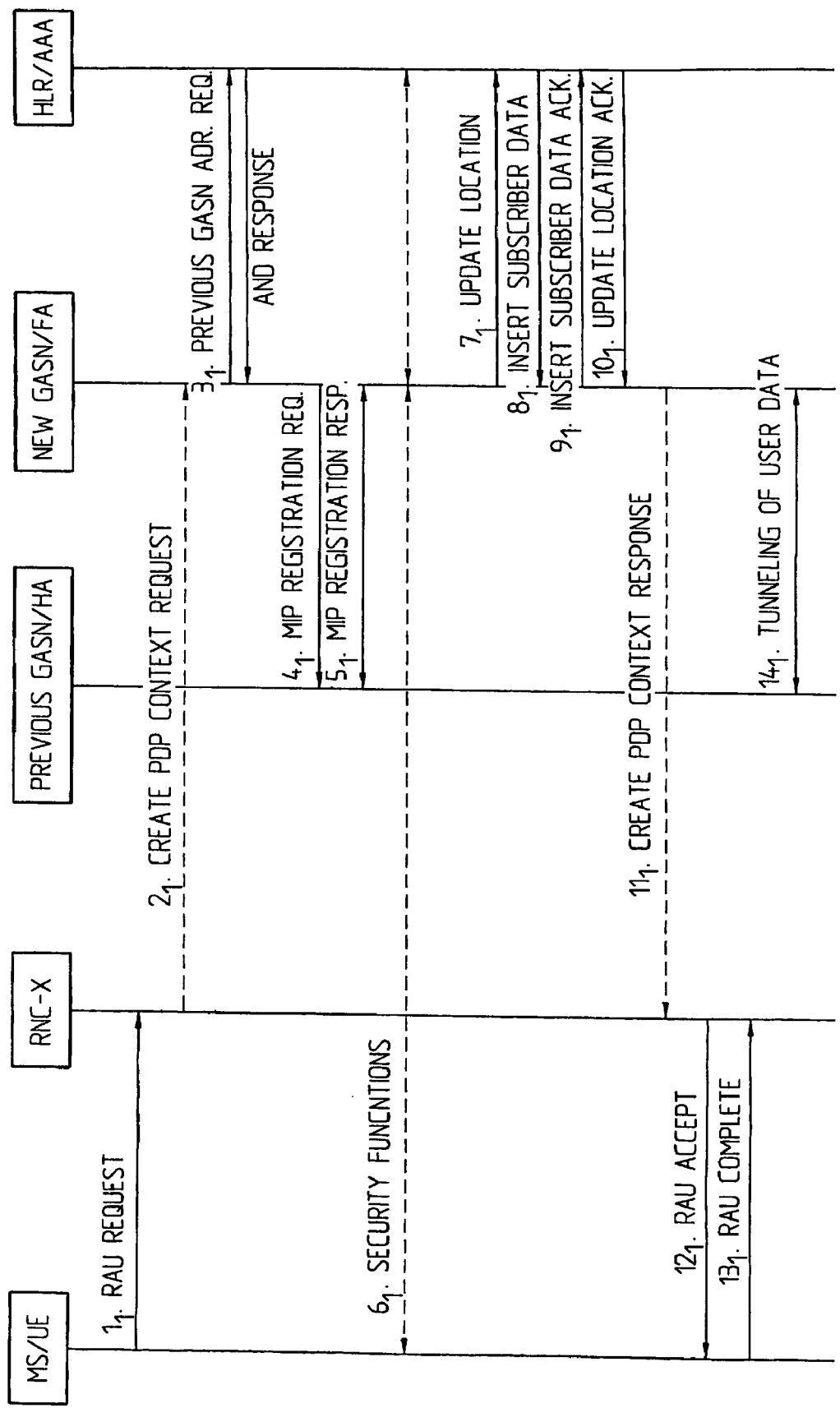
FIG. 6 is a sequence diagram illustrating the procedure when a user changes access from WLAN to UTRAN according to a second embodiment.

In an alternative implementation, illustrated in the sequence diagram of FIG. 6, the Mobile Internet Protocol, MIP, is used as a mobility protocol between GASN:s, here between new GASN and an old (previous) GASN, e.g. a PDG, between a WLAN and UTRAN. Preferably new MIP Extension formats are defined to transport the required information that currently are not defined for MIP (e.g. RAT (Radio Access Type), QoS negotiated (normally included in GTP) etc.) which are needed by the GASN.

In the sequence diagram of FIG. 6, sequence or message $1_1$ corresponds to message 1 of FIG. 5. However, then RNC-X sends a MIP registration request to the new GASN, Foreign Agent FA, $2_1$. GASN selection may be policy based and provided for in any appropriate manner. UE/MS indicates that IP address is not requested. The RAU request message may be piggybacked up to the new GASN and handled there. Message $3_1$ corresponds to message 3 of FIG. 5, and will therefore not be further commented upon (previous GASN address request and response).

However, then a MIP Registration Request (new GASN address) is sent from new GASN to the old GASN, e.g. a PDG, $4_1$. Alternatively a PDP context message might be used since the old GASN actually did not have an old GTP-tunnel, but rather an IP sec-tunnel to MS/UE. The old GASN remains the anchor point. The old GASN returns a MIP registration response (or an Update PDP context response), $5_1$. Messages $6_1$-$13_1$ correspond to the messages 6-13 discussed with reference to FIG. 5.

Finally user data is tunneled between the previous GASN and the new GASN using an encapsulation protocol defined for MIP, e.g. IP-in-IP or GRE, 14₁.

Figure 7:
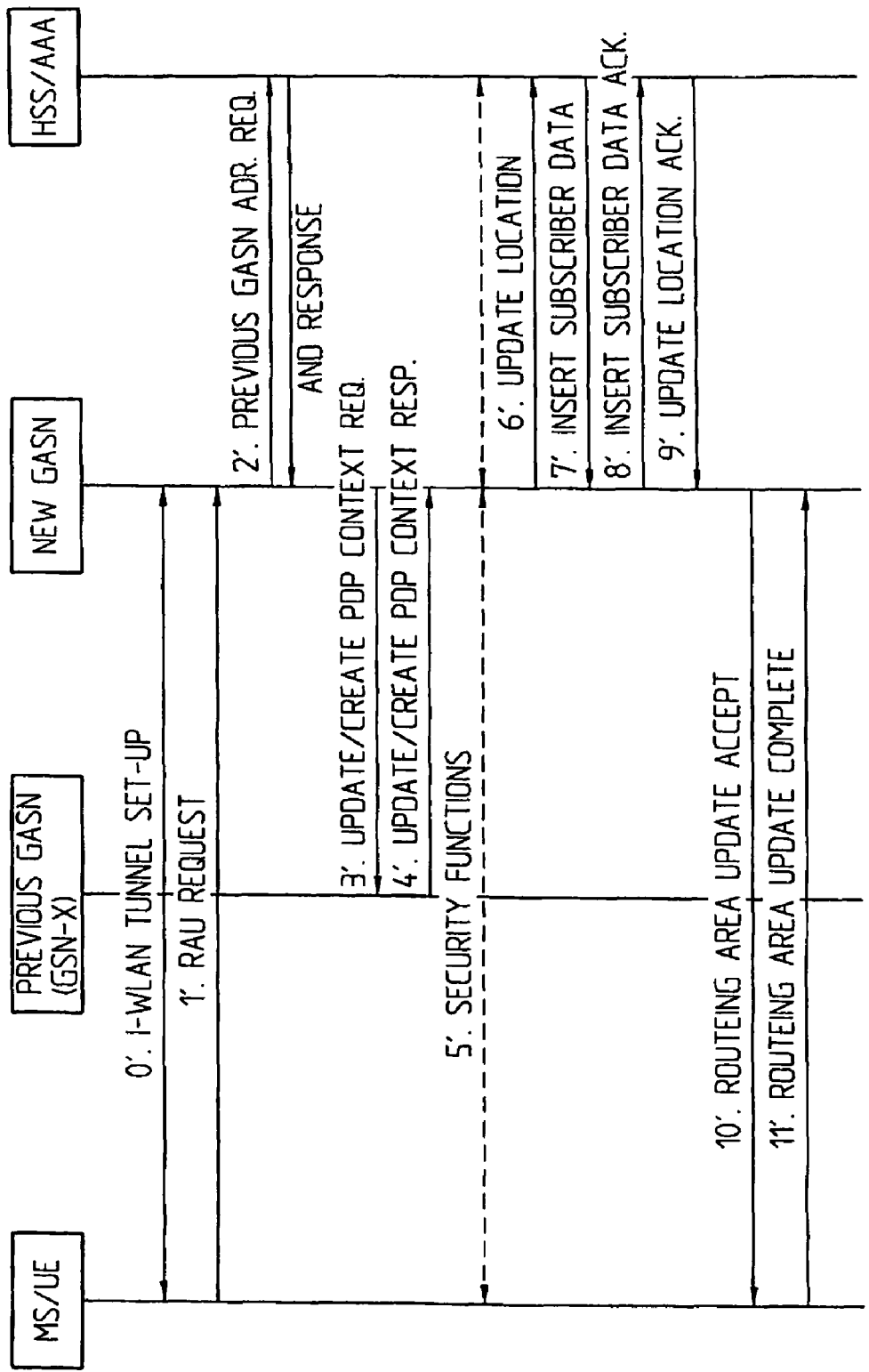
FIG. 7 is a sequence diagram describing the procedure when a user changes access type from a UTRAN to a WLAN according to a first embodiment.

FIG. 7 is a sequence diagram illustrating the opposite procedure according to a first GTP-based implementation of the present invention, i.e. here an UTRAN to I-WLAN handover, when a user decides or needs to make a handover from a UTRAN to a WLAN access. Hence, it is here supposed that the WLAN tunnel is set up between MS/UE and a new GASN, for example PDG-X, 0', e.g. a temporary IP address is used as discussed earlier in the application or it is possible to do it without assigning an IP address etc. It should be enabled to keep the same IP address as used in UTRAN. The MS/UE sends a routing area update request message, for example with IMSI, Update Type etc. to the new GASN, 1'. Update type shall for example indicate "update from UTRAN access". In this case the parameters P-TMSI, VLR TMSI, P-TMSI Signature, old RA etc. may, but do not have to, be present. The new GASN, for example a PDG, requests the address of the old GASN from HSS/AAA, and receives a response. Alternatively a routing area update request may contain an identifier, for example NAI, RAI etc. of the previous GASN so that the new GASN can find the previous GASN, without having to contact the HSS/AAA, 2'.

The new GASN, or PDG, sends an update PDP context request with e.g. new GASN address, QoS Negotiated, Tunnel Endpoint Identifier, serving network identity, CGI/SAI, RAT type etc to the GASN concerned, i.e. the previous GASN, 3'. Previous GASN then sends an update PDP context response to the new GASN, for example PDG, 4'. Security functions may optionally be executed now, 5', but it is merely illustrated through a dotted line since this does not form part of the present invention. The new GASN then informs HSS about the change of location by sending an update location message for example with GASN number, GASN address, IMSI, IMEISV to HSS, 6'. IMEISV is particularly only sent if the ADD is supported. HSS then sends Insert Subscriber data with for example IMSI, subscription data corresponding to the new GASN, 7'. The new GASN validates the presence of the MS/UE. The new GASN then constructs an MM context for the MS/UE and returns an Insert Subscriber data acknowledgement (IMSI) message to the HSS, 8', and HSS acknowledges the update location by sending an update location acknowledgement (IMSI) to the new GASN, 9'.

The new GASN then responds to the MS/UE with a routing area update accept, 10' for example with P-TMSI, VLR TMSI, P-TMSI Signature etc. (which however do not exist on the WLAN side), 10'. Finally the MS/UE confirms the reallocation of e.g. the TMSI:s or P-TMSI:s by returning a routing area update complete message to the new GASN, 11'. It should be clear that this merely illustrates one particular implementation of the inventive concept for a UTRAN to I-WLAN handover.

Figure 8:
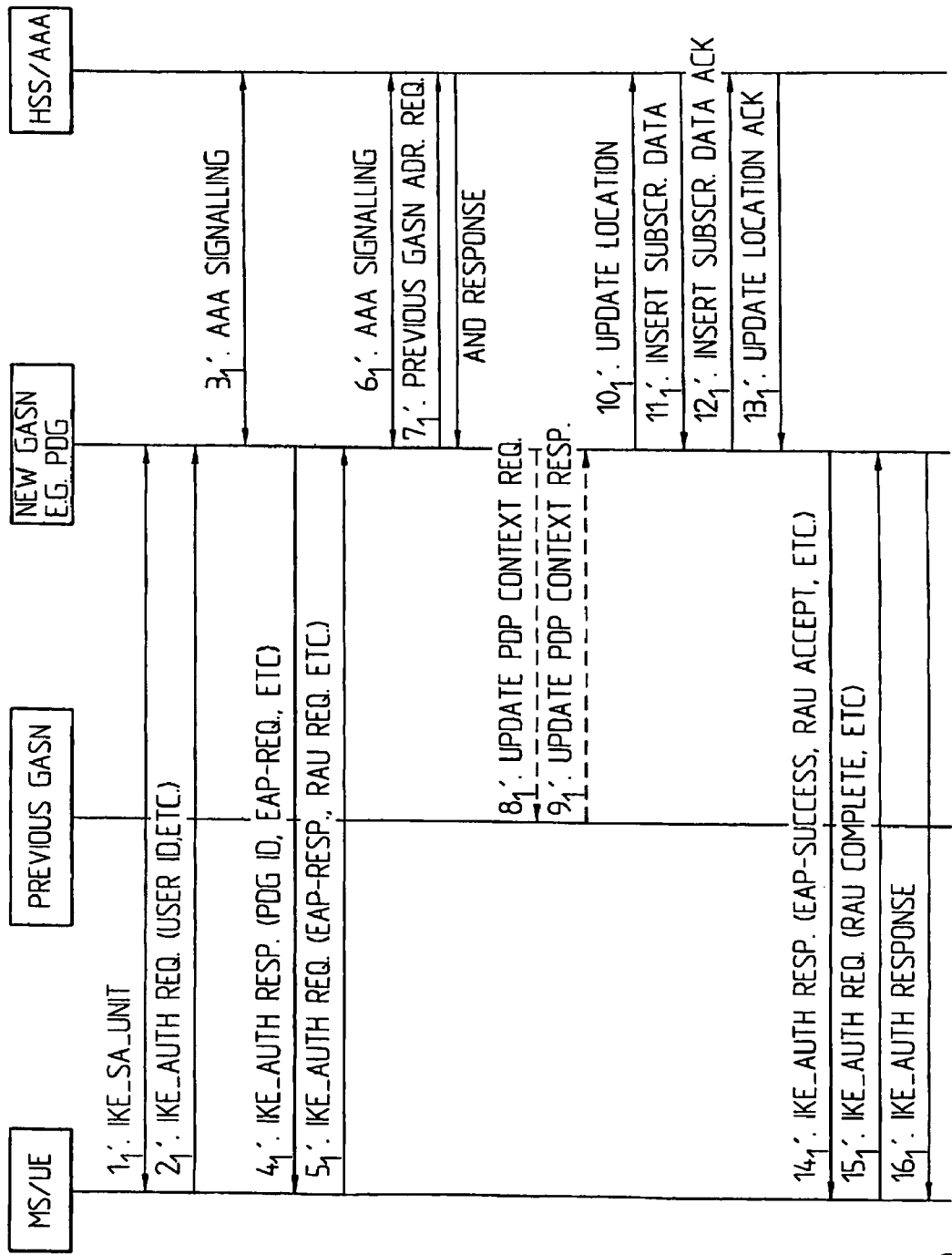
FIG. 8 is a sequence diagram describing the procedure when a user changes access type from a UTRAN to a WLAN according to a second embodiment.

FIG. 8 is a sequence diagram illustrating a UTRAN to I-WLAN handover according to another GTP-based implementation. When the terminal connects to I-WLAN, it performs authentication using IKEv2 and then sets up an IP Sec tunnel to the new GASN, e.g. PDG/TTG. In order to update the PDP context in the previous GASN and to establish the IP address of the MS before tunnel set up is completed, it is proposed to implicitly do a Routing Area Update during the tunnel set up procedure. This could be seen as piggybacking the Routing Area Update messages onto IKEv2 and/or IP sec messages. There are different possibilities for transporting the RAU information in IKEv2 messages. Options include e.g. the Vendor ID Payload of IKEv2 messages or Notify Payload. It is also possible to define new IKEv2 Payload types to carry RAU information.

It should be noted that the message sequence of FIG. 8 is an example only. The message exchange in IKEv2 may look different (different number of round trips etc.) depending on type of authentication, type of credentials etc. that are used. In the example below, the RAU information is included in the third, fourth and fifth IKE_AUTH messages. However, it is also possible to transport the RAU information in other IKE messages than the ones shown below.

IKE, Internet Key Exchange, v.2 is described in IETF Internet Draft, Draft-IETF-IP sec-IKEv2-17, dated 23.9.2004.

Below the sequence is briefly described:

$1_1'$ The MS/UE and the new GASN, e.g. a PDG, exchange the first pair of messages of IKEv2.

$2_1'$ The MS/UE sends an IKE_AUTH Request message to the new GASN, e.g. a PDG.

$3_1'$ The PDG communicates with the AAA server a part of the IKEv2 authentication. Details are not shown.

$4_1'$ The PDG responds with IKE_AUTH Response containing the PDG ID, EAP-Request (Extensible Authentication Protocol) etc.

$5_1'$ The MS sends a IKE_AUTH Request message to the new GASN (PDG). The message contains the RAU information needed. Update Type shall indicate "Update from UTRAN access". In this case the parameters P-TMSI, VLR TMSI, P-TMSI Signature, old RA etc. may be present.

$6_1'$ The new GASN (PDG) communicates with the AAA server a part of the IKEv2 authentication. Details are not shown.

$7_1'$ The new GASN (PDG) requests the previous GASN address from HSS/AAA. An alternative is that the Routing Area Update request contains an identifier (e.g. NAI, RAI, . . . , ) of the previous GASN so that the TTG can find it without having to contact the HSS/AAA. Another alternative is that this step is performed simultaneously with step $5_1'$ above.

$8_1'$ The new GASN (PDG) sends an Update PDP Context Request (new GASN (PDG) Address, QoS Negotiated, Tunnel Endpoint Identifier, serving network identity, CGI/SAI, RAT type) to the previous GASN concerned.

$9_1'$ The previous GASN sends an Update PDP Context Response to the new PDG.

$10_1'$ The new GASN (PDG) informs the HSS of the change of location by sending Update Location (PDG Number, PDG Address, IMSI, IMEISV) to the HSS. IMSEIV is sent if the ADD function is supported.

$11_1'$ The HSS sends Insert Subscriber Data (IMSI, subscription data) to the new GASN (PDG) which validates the presence of the MS.

$12_1'$ The new GASN (PDG) constructs an MM context for the MS and returns an Insert Subscriber Data Ack (IMSI) message to the HSS.

$13_1'$ The HSS acknowledges the Update Location by sending Update Location Ack (IMSI) to the new GASN (PDG).

$14_1'$ The new GASN (PDG) responds to the MS with an IKE_AUTH Response. The messages contains an EAP-Success which is part of the IKEv2 authentication. The message also contains the Routing Area Update Accept information (P-TMSI, VLR TMSI, P-TMSI Signature).

$15_1'$ The MS sends a IKE_AUTH Request message to the new GASN (PDG). The MS confirms the reallocation of the TMSI:s by including Routing Area Update Complete information to the PDG.

$16_1'$ The new GASN (PDG) completes the IKEv2 procedure by sending a IKE_AUTH Response.

Figure 9:
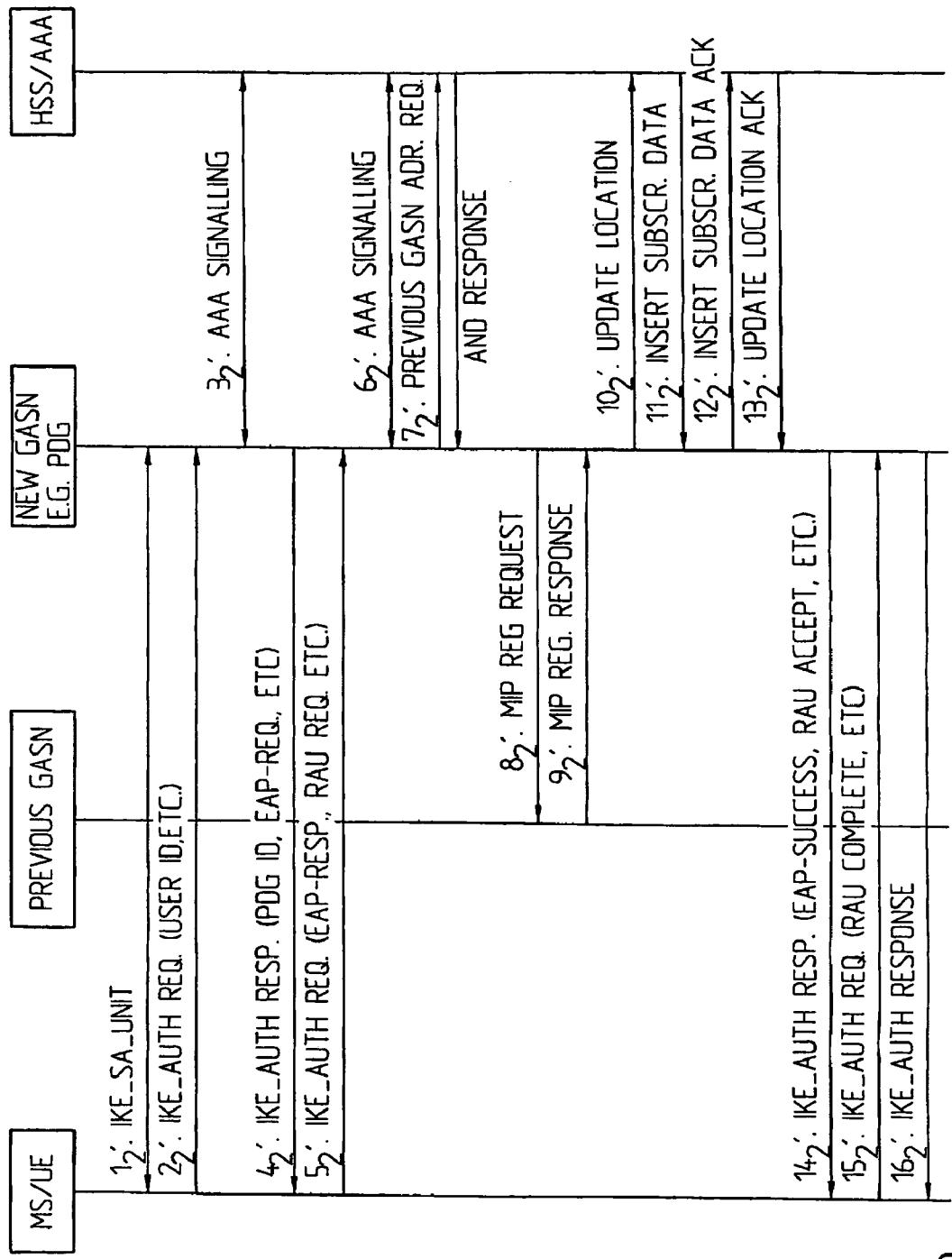
FIG. 9 is a sequence diagram describing the procedure when changing access type from a UTRAN to a WLAN according to a third embodiment.

A handover from UTRAN to I-WLAN can also be performed using an MIP based mobility protocol between a new GASN (e.g. PDG) and a previous GASN. As referred to above new MIP Extension formats are defined to transport the required information, e.g. RAT type etc. Such a procedure is schematically illustrated in FIG. 9. The steps are briefly discussed below:

$1_2'$ The MS/UE and the new GASN (PDG) exchange the first pair of messages of IKEv2.

$2_2'$ The MS sends a IKE_AUTH Request message to the new PDG.

$3_2'$ The new GASN (PDG) communicates with the AAA server a part of the IKEv2 authentication. Details are not shown.

$4_2'$ The new GASN (PDG) responds with a IKE_AUTH Response containing the PDG ID, EAP-Request etc.

$5_2'$ The MS sends a IKE_AUTH Request message to the new PDG. The message contains the RAU information needed. Update Type shall indicate "Update from UTRAN access". In this case the parameters P-TMSI, VLR TMSI, P-TMSI Signature, old RA etc. may be present.

$6_2'$ The new PDG communicates with the AAA server a part of the IKEv2 authentication. Details are not shown.

$7_2'$ The new PDG requests the previous GASN address from HSS/AAA, cf. $7_1'$, FIG. 8.

$8_2'$ The new PDG sends MIP Registration Request to the previous GASN concerned. The MIP message contains the required information (new PDG Address, QoS Negotiated, Tunnel Endpoint Identifier, serving network identity, CGI/SAI, RAT type).

$9_2'$ The previous GASN sends to new PDG an Update PDP Context Response.

$10_2'$ The new PDG informs the HSS of the change of location by sending Update Location (PDG Number, PDG Address, IMSI, IMEISV) to the HSS. IMEISV is sent if the ADD function is supported.

$11_2'$ The HSS sends Insert Subscriber Data (IMSI, subscription data) to the new PDG. The new PDG validates the MS:s presence.

$12_2'$ The PDG constructs an MM context for the MS and returns an Insert Subscriber Data Ack (IMSI) message to the HSS.

$13_2'$ The HSS acknowledges the Update Location by sending Update Location Ack (IMSI) to the new PDG.

$14_2'$ The new PDG responds to the MS with an IKE_AUTH Response. The message contains an EAP-Success which is part of the IKEv2 authentication. The message also contains the Routing Area Update Accept information (P-TMSI, VLR TMSI, P-TMSI Signature).

$15_2'$ The MS sends an IKE_AUTH Request message to the new PDG. The MS confirms the reallocation of the TMSI by including Routing Area Update Complete information to the PDG.

$16_2'$ The PDG completes the IKEv2 procedure by sending an IKE_AUTH Response. (Messages $9_2'$-$16_2'$ correspond to messages $9_1'$-$16_1'$ of FIG. 8.)

Figure 10:
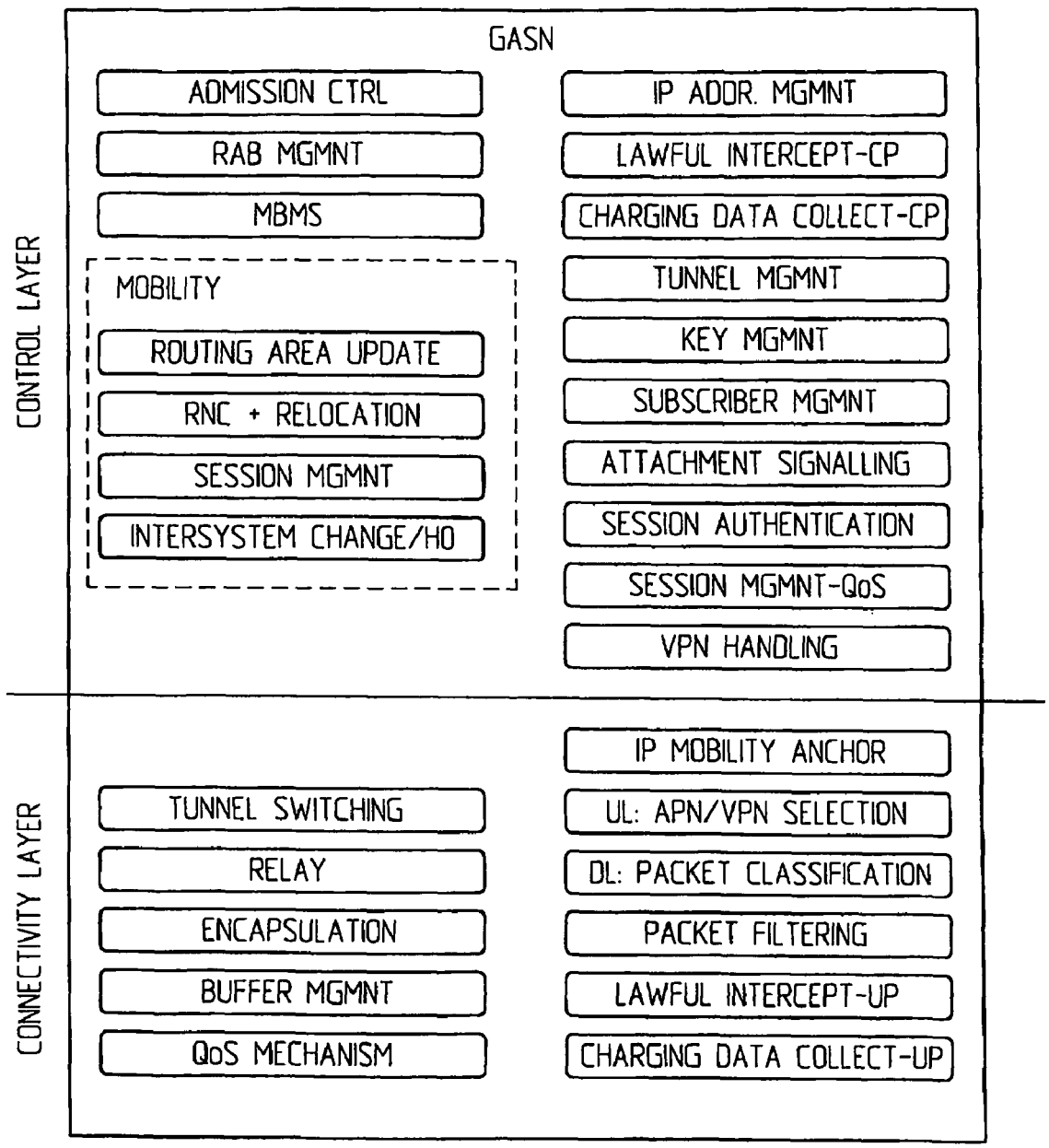
FIG. 10 is a very schematical block diagram of a GASN.

Finally FIG. 10 is a block diagram of an exemplary GASN according to one embodiment of the present invention. This particular implementation actually shows a new node comprising a modified GGSN that may include some or all existing GGSN functions and other new functions as well. A GASN may also be an evolved or modified node that supports other types of access networks such as a PDG/TTG supporting I-WLAN access or an evolved BRAS that supports broadband access. Further, it may support one or more access network specific accesses. In FIG. 7 particularly the functionalities illustrated within the dashed line concerning mobility are novel and important for a handover between different access systems, particularly comprising functionality of the control layer for routing area update, in this case, RNC-X relocation, session management and intersystem change/handover. The other functionalities are known and will not be further described herein.

Figure 11:
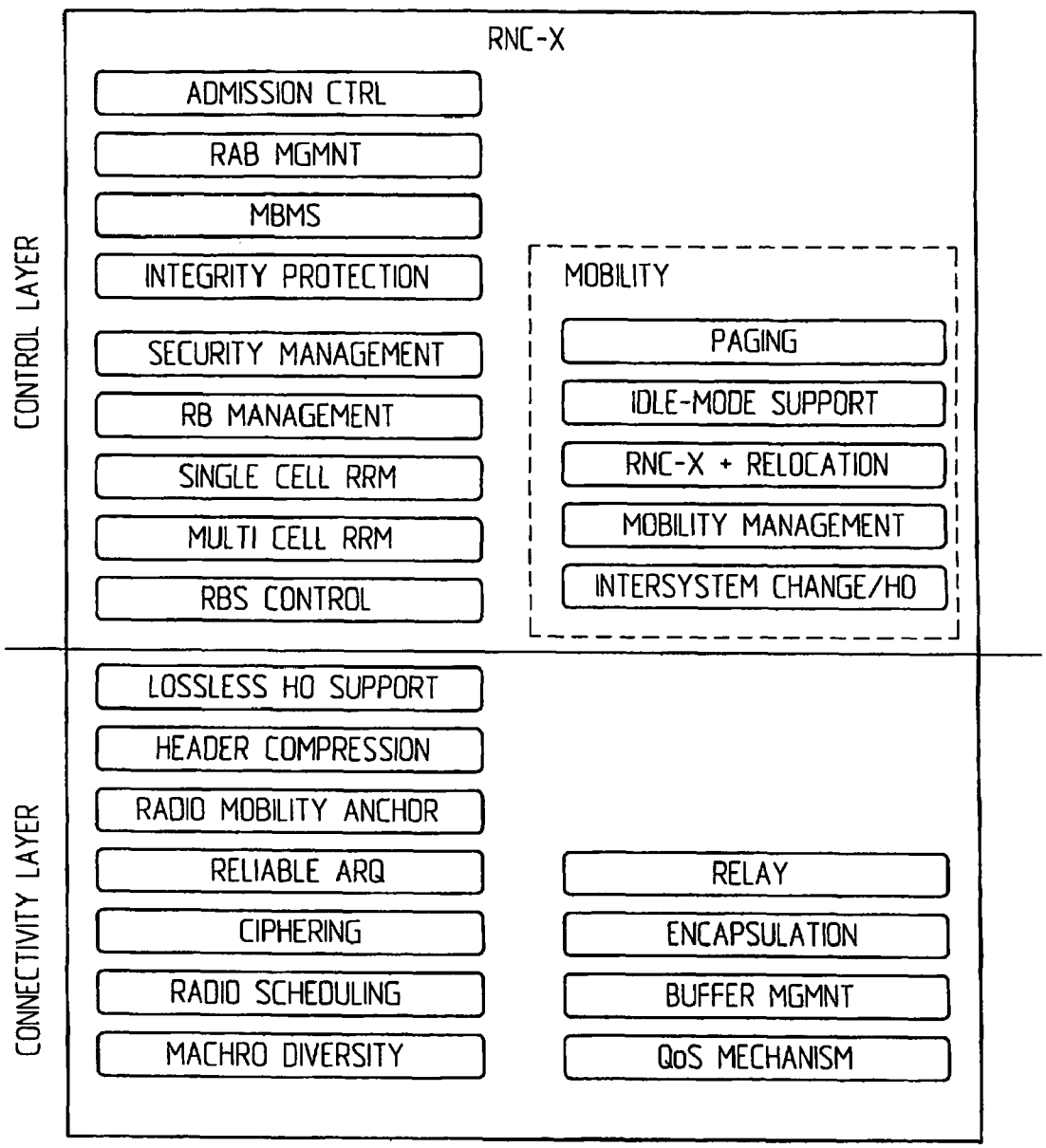
FIG. 11 is a very schematical block diagram of a modified RNC

Similarly FIG. 11 is a block diagram of an example of an RNC-X that is a new node comprising an enhanced or modified RNC that may include existing RNC functions and other new functions as well, for example some functions normally included in an SGSN. FIG. 11 is included herein merely for explanatory reasons. The functionalities that are essential for the functioning according to the inventive concept are illustrated within the dashed lines in the box mobility of the control layer, namely paging, idle-mode support, RNC-X relocation, mobility management and intersystem change/handover.

It is an advantage of the present invention that e.g. GTP can be reused and evolved for multi-access mobility, among others since GTP is a working protocol under the control of 3GPP. The mobile user terminal will reuse existing 3GPP mobility management and session management procedures, and thereby save internal state and protocol handling compared to if additional protocols are needed for multi-access specific features. The network only has to implement the GTP protocol for mobility related tunneling (if a GTP implementation is used).

Another advantage is that the terminal can use a single mobility management solution (GMM). The terminals do not have to support additional mobility protocols such as Mobile IP in order to achieve mobility in a multi-access scenario.

As an alternative, Mobile IP can be used as an intra-network protocol instead of GTP. The network then needs to support both GTP (for GPRS) and MIP (for multi-access). In this case the main advantage is that the terminal can continue to use GMM also for multi-access since it is not aware of which is the protocol that is used inside the network. However, also other mobility protocols may be constructed.

It should be clear that the invention is not limited to the specifically illustrated embodiments but it covers any type of handover between any types of access systems irrespectively of whether in visited or home networks etc. Also the nodes can be varied in a number of different ways as long as they support the features specified in the appended claims.

The invention claimed is:

1. A network system comprising:
   at least one core network,
   wherein each core network comprises a number of packet data gateway access supporting nodes (GASNs), handling mobile user station access over an access network,
   wherein said core network further provides access to one or more global packet data communication networks, and one or more nodes holding subscriber and/or mobile user station related information,
   wherein said packet data gateway access supporting nodes are adapted to:
      assign an IP-address to accessing mobile user stations,
      have at least one access type dependent interface to at least one type of access network,
      support inter-communication over a mobility protocol interface,
      at reception of a request for change of access type from a mobile user station, establish information about the previous packet data gateway access supporting node of the mobile user station, and
      use the established information to update an established communication context concerning the mobile user station or create a new communication context concerning the mobile user station such that mobility between different access network types is enabled for a mobile user station without interruption of an ongoing session, and
      in acting as a previous GASN, act as an anchor point for the user after a handover to another access network type, the mobility protocol being used to provide control signaling and user data tunneling between previous and new access support nodes,
   wherein at least one of said packet data gateway access supporting nodes is adapted to support access over more than one access network type, and
   wherein the intercommunication mobility protocol is Mobile Internet Protocol (MIP).

2. A network system according to claim 1, wherein one or more or each of said packet data gateway access supporting nodes is/are dedicated for access over a particular access network type.

3. A network system according to claim 1,
   wherein at least one packet data gateway access supporting node, GASN, is adapted to support access at least over a WLAN and/or a WiMAX and/or a fixed broadband access network, and/or a public Ethernet and/or a 2G or 3G or a S3G and
   wherein at least one other packet data gateway access supporting nodes is adapted to support access at least over a WLAN and/or a WiMAX and/or a fixed broadband access network, and/or a public Ethernet and/or a 2G or a 3G or a S3G and
   wherein said GASNs support access over different types of access networks.

4. A network system according to claim 1 wherein at least one of said GASNs comprises a modified Gateway GPRS support node (GGSN) with an extended functionality or a modified Serving GPRS support node (SGSN), or a modified Packet Data Gateway (PDG)/Tunnel Terminating Gateway (TTG) supporting at least WLAN and/or WiMAX access or a modified PDG supporting fixed broadband access.

5. A network system according to claim 1 wherein the intercommunication mobility protocol comprises GPRS Mobility Managemnt (GMM)/GPRS Tunneling Protocol (GTP).

6. A network system according to claim 1 wherein an IP address allocated to a user of a mobile user station is unaffected by handover between different access networks or types of access networks.

7. A network system according to claim 1
   wherein an access network comprises a WLAN or a fixed broadband access network and
   wherein the access type dependent interface comprises an interface for setting up an IP-sec tunnel between the mobile user station and a GASN over an access node of the access network.

8. A network system according to claim 1, wherein a General Packet Radio Service (GPRS) Inter SGSN Routing Area Update (ISRAU) procedure is adapted to be used for informing a GASN about previous GASN based on routing areas specified for WLAN and/or fixed broadband access networks.

9. A network system according to claim 1, wherein the GASNs are adapted to establish information about previous GASN by means of information included in messages from a mobile user station requesting handover between different access system types.

10. A network system according to claim 1, wherein means are provided for, upon handover from one access system to another for a mobile user station, creating a route between the mobile user station, and the new GASN via the previous GASN, said previous GASN hence forming at least a local anchor GASN.

11. A core network node comprising:
   a packet data gateway access supporting node handling mobile user station access over an access network and providing access to external global or local or third party controlled packet data communication networks,
   wherein it is adapted to be capable to assign IP addresses to accessing mobile user stations,
   wherein it has at least one access type dependent interface to at least one type of access network,
   wherein it has a mobility protocol interface supporting communication with other packet data gateway access supporting nodes, wherein it is adapted to establish information about which was the previous packet data gateway access supporting node for a mobile user station requesting access for establishing, or acquiring user or mobile user station related information, and wherein it further is adapted to, using the established user or mobile user station related information, update an established communication context concerning the mobile user station with the previous packet data gateway access supporting node or create a new communication context concerning the mobile user station, such that mobility between different access network types is enabled for a mobile user station requesting change of access type without interruption of or affecting an ongoing session or service, and wherein it is adapted to act at least as a local anchor point for a mobile user station having requested handover to another access network type, wherein the mobility protocol is used to provide control signaling and user data tunneling between previous and new access support nodes, wherein the core network node is adapted to support access over more than one access network type, and wherein the intercommunication mobility protocol is Mobile Internet Protocol (MIP).

12. A core network node according to claim 11, wherein it has an access type dependent interface supporting WLAN/WiMAX access and wherein it comprises a modified Packet Data Gateway, PDG.

13. A core network node according to claim 11, wherein it has an access interface supporting fixed broadband access network access and wherein it comprises a modified Broadband Remote Access Server (BRAS).

14. A core network node according to claim 11, wherein it has an access type dependent interface supporting 3G radio access network access and/or UTRAN access, and wherein it comprises a modified/extended Gateway GPRS support node (GGSN) or a modified Combined GPRS Support Node (CGSN) or a multi-access edge node connected to a packet data node.

15. A core network node according to claim 11, wherein it is adapted to establish information about previous GASN through communication with the Home Subscriber Server (HSS) or Home Location Register (HLR)/Authentication Authorization Accounting (AAA) of the mobile user station.

16. A core network node according to claim 11, wherein it is adapted to retrieve information from the mobile user station request concerning previous GASN or that it is adapted to use General Packet Radio Service (GPRS) Inter SGSN Routing Area Update (ISRAU) to establish the previous GASN, wherein routing areas are defined for WLAN and for fixed broadband.

17. A method for handling dual or multimode mobile user station access to a core network system comprising one or more core networks, said mobile user station having accessed the one or more core networks over an access network using a first access technology, wherein the method comprises the steps of:

receiving an access request relating to access over a second or new access network in a second or new packet data gateway access supporting node, GASN, during an ongoing session, establishing, in the second or new packet data gateway access supporting node, information about the previous or first GASN over which the mobile user station previously was provided with access and allocated an IP address, using a mobility protocol or, using said information about the previous GASN, providing communication between said previous GASN and/or a home GASN of the mobile user station to update an existing, previous communication context, or set up a new communication context, keeping the previous GASN at least as a local anchor point, informing the mobile user station that access is provided over said second or new access network, and providing the mobile user station with access over the new, second, access network without interrupting or affecting the ongoing session, and keeping the same, allocated IP address, and using the mobility protocol to provide control signaling and tunneling of user data between the previous and new packet data gateway access support nodes, wherein at least one of said packet data gateway access supporting nodes is adapted to support access over more than one access network type, and wherein the intercommunication mobility protocol is Mobile Internet Protocol (MIP).

18. A method according to claim 17, wherein packet data gateway access supporting nodes intercommunicate using the mobility protocol, said mobility protocol comprising the General Packet Radio Service (GPRS) Tunneling Protocol (GTP) or the Mobile Internet Protocol (MIP).

19. A method according to claim 17, wherein the establishing step comprises:

sending a request for the address of the previous GASN to a node holding subscriber or mobile user station related information from the second or new GASN, or establishing from information contained in a message from the mobile user station, the address or identity of the previous GASN or, implementing the General Packet Radio Service (GPRS) Inter SGSN Routing Area Update (ISRAU) procedure to establish information about the address or identity of the previous GASN, routing areas being defined for all concerned access networks.

\* \* \* \* \*

UNITED STATES PATENT AND TRADEMARK OFFICE
CERTIFICATE OF CORRECTION

PATENT NO. : 8,315,227 B2
APPLICATION NO. : 12/088372
DATED : November 20, 2012
INVENTOR(S) : Rydnell et al.

It is certified that error appears in the above-identified patent and that said Letters Patent is hereby corrected as shown below:

On the Title Page, in Field (57), under "ABSTRACT", in Column 2, Line 3, delete "GASNs" and insert -- GASN:s --, therefor.

On the Title Page, in Field (57), under "ABSTRACT", in Column 2, Line 4, delete "network(s)" and insert -- network --, therefor.

On the Title Page, in Field (57), under "ABSTRACT", in Column 2, Line 8, delete "GASNs" and insert -- GASN:s --, therefor.

In Fig. 1, Sheet 1 of 15, delete " *Fig. 1* " and insert -- *Fig. 1* --, therefor.

In Fig. 5, Sheet 9 of 15, in Step "1.", in Line 1, delete "ROUTEING" and insert -- ROUTING --, therefor.

In Fig. 6, Sheet 10 of 15, in Step "$6_1$.", in Line 1, delete "FUNCNTIONS" and insert -- FUNCTIONS --, therefor.

In Fig. 7, Sheet 11 of 15, in Step "10′.", in Line 1, delete "ROUTEING" and insert -- ROUTING --, therefor.

In Fig. 7, Sheet 11 of 15, in Step "11′.", in Line 1, delete "ROUTEING" and insert -- ROUTING --, therefor.

In Fig. 11, Sheet 15 of 15, delete "MACHRO DIVERSITY" and insert -- MACRO DIVERSITY --, therefor.

In Column 6, Line 21, delete "of;" and insert -- of: --, therefor.

Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 8,315,227 B2

In Column 8, Line 10, delete "RNC" and insert -- RNC. --, therefor.

In Column 8, Line 45, delete "13" and insert -- $1_3$ --, therefor.

In Column 8, Line 62, delete "particularly," and insert -- particularly --, therefor.

In Column 13, Line 49, delete "141." and insert -- $14_1.$ --, therefor.

In Column 14, Line 42, delete "implicitly" and insert -- implicity --, therefor.

In Column 18, Line 18, in Claim 4, delete "1" and insert -- 1, --, therefor.

In Column 18, Line 25, in Claim 5, delete "1" and insert -- 1, --, therefor.

In Column 18, Line 27, in Claim 5, delete "Managemnt" and insert -- Management --, therefor.

In Column 18, Line 29, in Claim 6, delete "1" and insert -- 1, --, therefor.

In Column 18, Line 33, in Claim 7, delete "1" and insert -- 1, --, therefor.